United States Patent
Gorokhov et al.

(10) Patent No.: US 9,461,859 B2
(45) Date of Patent: Oct. 4, 2016

(54) PILOT SIGNAL TRANSMISSION FOR AN ORTHOGONAL FREQUENCY DIVISION WIRELESS COMMUNICATION SYSTEM

(75) Inventors: Alexei Gorokhov, San Diego, CA (US); Ayman Fawzy Naguib, Cupertino, CA (US); Arak Sutivong, Bangkok (TH); Dhananjay Ashok Gore, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1029 days.

(21) Appl. No.: 11/261,361

(22) Filed: Oct. 27, 2005

(65) Prior Publication Data

US 2006/0209732 A1 Sep. 21, 2006

Related U.S. Application Data

(63) Continuation-in-part of application No. 11/083,693, filed on Mar. 17, 2005, now Pat. No. 9,143,305.

(51) Int. Cl.
*H04B 3/10* (2006.01)
*H04L 27/26* (2006.01)
(Continued)

(52) U.S. Cl.
CPC ........... *H04L 27/2613* (2013.01); *H04B 1/715* (2013.01); *H04L 5/0023* (2013.01);
(Continued)

(58) Field of Classification Search
CPC .. H04B 7/0617; H04B 1/713; H04B 7/0632; H04B 1/715; H04B 7/0491; H04B 7/0626; H04B 7/12; H04B 7/0413; H04B 7/0684; H04B 1/7143; H04B 7/0697; H04L 5/0048; H04L 5/0007; H04L 25/0226; H04L 27/2613; H04L 5/0023; H04L 25/0204; H04L 27/2602; H04L 5/0051; H04L 1/0618; H04L 1/0071; H04L 27/2675; H04L 25/022; H04L 27/2601; H04L 2025/034; H04L 1/06; H04L 5/023; H04L 1/1887; H04L 25/03866; H04L 27/0014; H04L 27/2647; H04L 1/0668; H04L 27/2608; H04L 5/0005; H04L 25/228
USPC ....... 370/203, 343, 208, 344, 332, 491, 329, 370/252, 328, 336, 280, 338, 330, 500, 320, 370/321; 375/267, 260, 340, 135, 299, 130, 375/224, 326, 316, 295, 347; 455/522, 502, 455/423, 452.1, 452.2, 450, 101, 296, 403, 455/42, 464, 501, 500, 69, 59
See application file for complete search history.

(56) References Cited

U.S. PATENT DOCUMENTS 4,393,276 A 7/1983 Steele et al.
4,554,668 A 11/1985 Deman et al.
(Continued)

FOREIGN PATENT DOCUMENTS

CA 2348137 11/2001
CA 2477536 9/2003
(Continued)

OTHER PUBLICATIONS

Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
(Continued)

*Primary Examiner* — Fred Casca

(57) ABSTRACT

Transmission patterns for pilot symbols transmitted from a mobile station or base station are provided. The pattern allows for improved receipt of the pilot symbols transmitted for frequency selective channels and users. In addition, schemes for improving the ability to multiplex pilot symbols without interference and/or biasing from different mobile stations over the same frequencies and in the same time slots.

19 Claims, 13 Drawing Sheets

(51) Int. Cl.
*H04W 16/28* (2009.01)
*H04W 72/12* (2009.01)
*H04B 1/715* (2011.01)
*H04L 5/00* (2006.01)
*H04L 25/03* (2006.01)
*H04B 7/04* (2006.01)
*H04B 7/12* (2006.01)
*H04L 1/00* (2006.01)
*H04L 25/02* (2006.01)

(52) U.S. Cl.
CPC ........... *H04L5/0051* (2013.01); *H04L 5/0058* (2013.01); *H04L 25/0216* (2013.01); *H04L 25/0222* (2013.01); *H04L 25/0226* (2013.01); *H04L 25/03866* (2013.01); *H04L 27/261* (2013.01); *H04W 16/28* (2013.01); *H04W 72/1205* (2013.01); *H04B 7/0413* (2013.01); *H04B 7/12* (2013.01); *H04B 2001/7154* (2013.01); *H04L 1/0026* (2013.01); *H04L 25/0204* (2013.01); *H04L 25/0228* (2013.01)

(56) References Cited

U.S. PATENT DOCUMENTS

| | | |
|---|---|---|
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer et al. |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany et al. |
| 5,406,551 A | 4/1995 | Saito et al. |
| 5,410,538 A | 4/1995 | Roche et al. |
| 5,455,839 A | 10/1995 | Eyuboglu et al. |
| 5,465,253 A | 11/1995 | Rahnema |
| 5,491,727 A | 2/1996 | Petit et al. |
| 5,513,379 A | 4/1996 | Benveniste et al. |
| 5,539,748 A | 7/1996 | Raith et al. |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang et al. |
| 5,828,650 A | 10/1998 | Malkamaki et al. |
| 5,838,268 A | 11/1998 | Frenkel et al. |
| 5,867,478 A | 2/1999 | Baum et al. |
| 5,870,393 A | 2/1999 | Yano et al. |
| 5,887,023 A | 3/1999 | Mabuchi et al. |
| 5,907,585 A | 5/1999 | Suzuki et al. |
| 5,920,571 A | 7/1999 | Houck et al. |
| 5,926,470 A | 7/1999 | Tiedemann, Jr. et al. |
| 5,933,421 A | 8/1999 | Alamouti et al. |
| 5,949,814 A | 9/1999 | Odenwalder et al. |
| 5,953,325 A | 9/1999 | Willars et al. |
| 5,955,992 A | 9/1999 | Shattil et al. |
| 5,956,642 A | 9/1999 | Larsson et al. |
| 5,995,992 A | 11/1999 | Eckard et al. |
| 5,999,826 A | 12/1999 | Whinnett |
| 6,002,942 A | 12/1999 | Park et al. |
| 6,016,123 A | 1/2000 | Barton et al. |
| 6,038,150 A | 3/2000 | Yee et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng et al. |
| 6,075,797 A | 6/2000 | Thomas |
| 6,076,114 A | 6/2000 | Wesley et al. |
| 6,088,345 A | 7/2000 | Sakoda et al. |
| 6,088,592 A | 7/2000 | Doner et al. |
| 6,108,323 A | 8/2000 | Gray et al. |
| 6,108,550 A | 8/2000 | Wiorek et al. |
| 6,112,094 A | 8/2000 | Dent et al. |
| 6,128,776 A | 10/2000 | Kang et al. |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | van Nee et al. |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim et al. |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia et al. |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,418 B1 | 10/2002 | Laroia et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee et al. |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous et al. |
| 6,654,339 B1 | 11/2003 | Bohnke et al. |
| 6,654,431 B1 | 11/2003 | Barton et al. |

(56) References Cited

U.S. PATENT DOCUMENTS

| | | |
|---|---|---|
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng et al. |
| 6,675,012 B2 | 1/2004 | Gray et al. |
| 6,678,318 B1 | 1/2004 | Lai et al. |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura et al. |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan et al. |
| 6,751,456 B2 | 6/2004 | Bilgic et al. |
| 6,754,511 B1 | 6/2004 | Halford et al. |
| 6,763,009 B1 | 7/2004 | Bedekar et al. |
| 6,765,969 B1 | 7/2004 | Vook et al. |
| 6,776,165 B2 | 8/2004 | Jin et al. |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B2 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,909,797 B2 | 6/2005 | Romsdahl et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia et al. |
| 6,934,266 B2 | 8/2005 | Dulin et al. |
| 6,934,275 B1 | 8/2005 | Love et al. |
| 6,934,340 B1 | 8/2005 | Dollard et al. |
| 6,940,842 B2 | 9/2005 | Proctor, Jr. |
| 6,940,845 B2 | 9/2005 | Benveniste et al. |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil et al. |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem et al. |
| 7,020,110 B2 | 3/2006 | Walton et al. |
| 7,023,880 B2 | 4/2006 | El-Maleh et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,092,670 B2 | 8/2006 | Tanaka et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius et al. |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,188,300 B2 | 3/2007 | Eriksson et al. |
| 7,197,282 B2 | 3/2007 | Dent et al. |
| 7,200,177 B2 | 4/2007 | Miyoshi et al. |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal et al. |
| 7,257,167 B2 | 8/2007 | Lau et al. |
| 7,257,406 B2 | 8/2007 | Ji et al. |
| 7,257,423 B2 | 8/2007 | Iochi et al. |
| 7,260,153 B2 | 8/2007 | Nissani et al. |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |

(56) References Cited

U.S. PATENT DOCUMENTS

| | | |
|---|---|---|
| 7,292,863 B2 | 11/2007 | Chen et al. |
| 7,295,509 B2 | 11/2007 | Laroia et al. |
| 7,313,086 B2 | 12/2007 | Aizawa et al. |
| 7,313,126 B2 | 12/2007 | Yun et al. |
| 7,313,174 B2 | 12/2007 | Alard et al. |
| 7,313,407 B2 | 12/2007 | Shapira et al. |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara et al. |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen et al. |
| 7,418,043 B2 | 8/2008 | Shattil et al. |
| 7,418,246 B2 | 8/2008 | Kim et al. |
| 7,423,991 B2 | 9/2008 | Cho et al. |
| 7,426,426 B2 | 9/2008 | Van Baren et al. |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen et al. |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,483,408 B2 | 1/2009 | Bevan et al. |
| 7,483,719 B2 | 1/2009 | Kim et al. |
| 7,486,408 B2 | 2/2009 | Van Der Schaar et al. |
| 7,486,735 B2 | 2/2009 | Dubuc et al. |
| 7,492,788 B2 | 2/2009 | Zhang et al. |
| 7,499,393 B2 | 3/2009 | Ozluturk et al. |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim et al. |
| 7,627,051 B2 | 12/2009 | Shen et al. |
| 7,639,728 B2 | 12/2009 | Laroia et al. |
| 7,664,061 B2 | 2/2010 | Hottinen |
| 7,676,007 B1 | 3/2010 | Choi et al. |
| 7,684,507 B2 | 3/2010 | Levy |
| 7,720,000 B2 | 5/2010 | Yoshida et al. |
| 7,724,777 B2 | 5/2010 | Sutivong et al. |
| 7,768,979 B2 | 8/2010 | Sutivong et al. |
| 7,873,002 B2 | 1/2011 | Cai |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,031,583 B2 | 10/2011 | Classon et al. |
| 8,045,512 B2 | 10/2011 | Khandekar et al. |
| 8,095,141 B2 | 1/2012 | Teague |
| 8,098,568 B2 | 1/2012 | Laroia et al. |
| 8,098,569 B2 | 1/2012 | Laroia et al. |
| 8,208,420 B2 | 6/2012 | Liu et al. |
| 8,331,463 B2 | 12/2012 | Jayaraman et al. |
| 8,446,892 B2 | 5/2013 | Ji et al. |
| 8,462,859 B2 | 6/2013 | Sampath et al. |
| 8,477,684 B2 | 7/2013 | Khandekar et al. |
| 8,488,507 B2 | 7/2013 | Luft et al. |
| 8,582,509 B2 | 11/2013 | Khandekar et al. |
| 8,582,548 B2 | 11/2013 | Gore et al. |
| 8,811,306 B2 | 8/2014 | Callard et al. |
| 2001/0021650 A1 | 9/2001 | Bilgic et al. |
| 2001/0024427 A1 | 9/2001 | Suzuki |
| 2001/0030948 A1 | 10/2001 | Tiedemann, Jr. |
| 2001/0047424 A1 | 11/2001 | Alastalo et al. |
| 2001/0053140 A1 | 12/2001 | Choi et al. |
| 2001/0055294 A1 | 12/2001 | Motoyoshi et al. |
| 2001/0055297 A1 | 12/2001 | Benveniste et al. |
| 2002/0000948 A1 | 1/2002 | Chun et al. |
| 2002/0015405 A1 | 2/2002 | Sepponen et al. |
| 2002/0018157 A1 | 2/2002 | Zhang et al. |
| 2002/0039912 A1 | 4/2002 | Yamaguchi et al. |
| 2002/0044524 A1 | 4/2002 | Laroia et al. |
| 2002/0058525 A1 | 5/2002 | Kasapi et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan et al. |
| 2002/0101839 A1 | 8/2002 | Farley et al. |
| 2002/0122381 A1 | 9/2002 | Wu et al. |
| 2002/0122403 A1 | 9/2002 | Hashem et al. |
| 2002/0128035 A1 | 9/2002 | Jokinen et al. |
| 2002/0147953 A1 | 10/2002 | Catreux et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0181571 A1 | 12/2002 | Yamano et al. |
| 2002/0191569 A1 | 12/2002 | Sung et al. |
| 2002/0193146 A1 | 12/2002 | Wallace et al. |
| 2003/0002464 A1 | 1/2003 | Rezaiifar et al. |
| 2003/0020651 A1 | 1/2003 | Crilly, Jr. et al. |
| 2003/0027579 A1 | 2/2003 | Sydon |
| 2003/0035491 A1 | 2/2003 | Walton et al. |
| 2003/0036359 A1 | 2/2003 | Dent et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072254 A1 | 4/2003 | Ma et al. |
| 2003/0072255 A1 | 4/2003 | Ma et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1 | 4/2003 | Giannakis et al. |
| 2003/0076890 A1 | 4/2003 | Hochwald et al. |
| 2003/0086371 A1 | 5/2003 | Walton et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0109226 A1 | 6/2003 | Brunner et al. |
| 2003/0109266 A1 | 6/2003 | Rafiah et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0128658 A1 | 7/2003 | Walton et al. |
| 2003/0133426 A1 | 7/2003 | Schein et al. |

(56) References Cited

U.S. PATENT DOCUMENTS

| | | |
|---|---|---|
| 2003/0142648 A1 | 7/2003 | Semper |
| 2003/0142729 A1 | 7/2003 | Subrahmanya et al. |
| 2003/0147371 A1 | 8/2003 | Choi et al. |
| 2003/0157900 A1 | 8/2003 | Gaal et al. |
| 2003/0161281 A1 | 8/2003 | Dulin et al. |
| 2003/0161282 A1 | 8/2003 | Medvedev et al. |
| 2003/0165189 A1 | 9/2003 | Kadous et al. |
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0202560 A1 | 10/2003 | Tiedemann, Jr. et al. |
| 2003/0216156 A1 | 11/2003 | Chun et al. |
| 2003/0228850 A1 | 12/2003 | Hwang |
| 2003/0235255 A1 | 12/2003 | Ketchum et al. |
| 2003/0236080 A1 | 12/2003 | Kadous et al. |
| 2004/0001429 A1 | 1/2004 | Ma et al. |
| 2004/0001460 A1 | 1/2004 | Bevan et al. |
| 2004/0002364 A1 | 1/2004 | Trikkonen et al. |
| 2004/0009783 A1 | 1/2004 | Miyoshi et al. |
| 2004/0010623 A1 | 1/2004 | Sher et al. |
| 2004/0015692 A1 | 1/2004 | Green et al. |
| 2004/0017785 A1 | 1/2004 | Zelst et al. |
| 2004/0032443 A1 | 2/2004 | Moylan et al. |
| 2004/0042558 A1 | 3/2004 | Hwang et al. |
| 2004/0048609 A1 | 3/2004 | Kosaka et al. |
| 2004/0048630 A1 | 3/2004 | Shapira et al. |
| 2004/0054999 A1 | 3/2004 | Willen et al. |
| 2004/0057394 A1 | 3/2004 | Holtzman et al. |
| 2004/0058687 A1 | 3/2004 | Kim et al. |
| 2004/0066754 A1 | 4/2004 | Hottinen et al. |
| 2004/0066761 A1 | 4/2004 | Giannakis et al. |
| 2004/0066772 A1 | 4/2004 | Moon et al. |
| 2004/0067756 A1 | 4/2004 | Wager et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081073 A1 | 4/2004 | Walton et al. |
| 2004/0081195 A1 | 4/2004 | El-Maleh et al. |
| 2004/0087325 A1 | 5/2004 | Cheng et al. |
| 2004/0095907 A1 | 5/2004 | Agee et al. |
| 2004/0097215 A1 | 5/2004 | Abe et al. |
| 2004/0097240 A1 | 5/2004 | Chen et al. |
| 2004/0098505 A1 | 5/2004 | Clemmensen et al. |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0128605 A1* | 7/2004 | Sibecas et al. ............... 714/746 |
| 2004/0131007 A1 | 7/2004 | Smee et al. |
| 2004/0131008 A1 | 7/2004 | Zuniga et al. |
| 2004/0131038 A1 | 7/2004 | Kim et al. |
| 2004/0131110 A1 | 7/2004 | Alard et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar et al. |
| 2004/0160933 A1 | 8/2004 | Odenwalder et al. |
| 2004/0162083 A1 | 8/2004 | Chen et al. |
| 2004/0165564 A1 | 8/2004 | Kim et al. |
| 2004/0166867 A1 | 8/2004 | Hawe et al. |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0171385 A1* | 9/2004 | Haustein et al. ............. 455/450 |
| 2004/0178954 A1 | 9/2004 | Vook et al. |
| 2004/0179480 A1 | 9/2004 | Attar et al. |
| 2004/0179494 A1 | 9/2004 | Attar et al. |
| 2004/0179506 A1 | 9/2004 | Padovani et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0190640 A1 | 9/2004 | Dubuc et al. |
| 2004/0202257 A1 | 10/2004 | Mehta et al. |
| 2004/0208138 A1 | 10/2004 | Hayashi et al. |
| 2004/0218520 A1* | 11/2004 | Aizawa ......................... 370/203 |
| 2004/0219819 A1 | 11/2004 | Di Mascio et al. |
| 2004/0219919 A1 | 11/2004 | Whinnett et al. |
| 2004/0224711 A1 | 11/2004 | Panchal et al. |
| 2004/0228267 A1 | 11/2004 | Agrawal et al. |
| 2004/0228313 A1 | 11/2004 | Cheng et al. |
| 2004/0229615 A1 | 11/2004 | Agrawal et al. |
| 2004/0240419 A1 | 12/2004 | Abrishamkar et al. |
| 2004/0240572 A1* | 12/2004 | Brutel et al. .................. 375/260 |
| 2004/0248604 A1 | 12/2004 | Vaidyanathan et al. |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264585 A1 | 12/2004 | Borran et al. |
| 2004/0264593 A1 | 12/2004 | Shim et al. |
| 2005/0002412 A1 | 1/2005 | Sagfors et al. |
| 2005/0002440 A1 | 1/2005 | Alamouti et al. |
| 2005/0002467 A1 | 1/2005 | Seo et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009486 A1 | 1/2005 | Al-Dhahir et al. |
| 2005/0013263 A1 | 1/2005 | Kim et al. |
| 2005/0025093 A1 | 2/2005 | Yun et al. |
| 2005/0030886 A1 | 2/2005 | Wu et al. |
| 2005/0030964 A1 | 2/2005 | Tiedemann, Jr. et al. |
| 2005/0034079 A1 | 2/2005 | Gunasekar et al. |
| 2005/0041611 A1 | 2/2005 | Sandhu et al. |
| 2005/0041618 A1 | 2/2005 | Wei et al. |
| 2005/0041750 A1 | 2/2005 | Lau et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1 | 3/2005 | Kadous et al. |
| 2005/0053081 A1 | 3/2005 | Andersson et al. |
| 2005/0053151 A1 | 3/2005 | Lin et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0085195 A1 | 4/2005 | Tong et al. |
| 2005/0085236 A1 | 4/2005 | Gerlach et al. |
| 2005/0111397 A1 | 5/2005 | Attar et al. |
| 2005/0113100 A1 | 5/2005 | Oprescu-Surcobe et al. |
| 2005/0122898 A1 | 6/2005 | Jang et al. |
| 2005/0128683 A1 | 6/2005 | Watanabe et al. |
| 2005/0128983 A1 | 6/2005 | Kim et al. |
| 2005/0135324 A1 | 6/2005 | Kim et al. |
| 2005/0135498 A1 | 6/2005 | Yee |
| 2005/0141624 A1 | 6/2005 | Lakshmipathi et al. |
| 2005/0147024 A1* | 7/2005 | Jung et al. .................... 370/203 |
| 2005/0147025 A1 | 7/2005 | Auer et al. |
| 2005/0152484 A1 | 7/2005 | Sandhu et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0181799 A1 | 8/2005 | Laroia et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201180 A1 | 9/2005 | Naguib et al. |
| 2005/0201296 A1 | 9/2005 | Vannithamby et al. |
| 2005/0207367 A1 | 9/2005 | Onggosanusi et al. |
| 2005/0215196 A1 | 9/2005 | Krishnan et al. |
| 2005/0215251 A1 | 9/2005 | Krishnan et al. |
| 2005/0226204 A1 | 10/2005 | Uehara et al. |
| 2005/0239465 A1 | 10/2005 | Lee et al. |
| 2005/0243791 A1* | 11/2005 | Park et al. .................... 370/343 |

(56) References Cited

U.S. PATENT DOCUMENTS

| | | |
|---|---|---|
| 2005/0246548 A1 | 11/2005 | Laitinen et al. |
| 2005/0249266 A1 | 11/2005 | Brown et al. |
| 2005/0254416 A1 | 11/2005 | Laroia et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard et al. |
| 2005/0259757 A1 | 11/2005 | Wu et al. |
| 2005/0265220 A1 | 12/2005 | Erlich et al. |
| 2005/0265293 A1 | 12/2005 | Ro et al. |
| 2005/0265470 A1 | 12/2005 | Kishigami et al. |
| 2005/0271012 A1 | 12/2005 | Agrawal et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281029 A1 | 12/2005 | Inamoto et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal et al. |
| 2006/0018397 A1 | 1/2006 | Sampath et al. |
| 2006/0026344 A1 | 2/2006 | Sun Hsu et al. |
| 2006/0029289 A1 | 2/2006 | Yamaguchi et al. |
| 2006/0034164 A1 | 2/2006 | Ozluturk et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim et al. |
| 2006/0045003 A1 | 3/2006 | Choi et al. |
| 2006/0046643 A1 | 3/2006 | Izumikawa et al. |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093065 A1 | 5/2006 | Thomas et al. |
| 2006/0104333 A1 | 5/2006 | Rainbolt et al. |
| 2006/0104381 A1 | 5/2006 | Menon et al. |
| 2006/0107171 A1 | 5/2006 | Skraparlis |
| 2006/0109814 A1 | 5/2006 | Kuzminskiy et al. |
| 2006/0111054 A1 | 5/2006 | Pan et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146764 A1 | 7/2006 | Takemoto et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1* | 8/2006 | Nishio et al. ............... 455/67.11 |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki et al. |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041311 A1 | 2/2007 | Baum et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0081507 A1 | 4/2007 | Koo et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou et al. |
| 2007/0098050 A1 | 5/2007 | Khandekar et al. |
| 2007/0098120 A1 | 5/2007 | Wang et al. |
| 2007/0099666 A1* | 5/2007 | Astely et al. ............... 455/562.1 |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0075094 A1 | 3/2008 | Ahn et al. |
| 2008/0095223 A1 | 4/2008 | Tong et al. |
| 2008/0095262 A1 | 4/2008 | Ho et al. |
| 2008/0108355 A1 | 5/2008 | Oleszcsuk |
| 2008/0151829 A1 | 6/2008 | Khandekar et al. |
| 2008/0181139 A1 | 7/2008 | Rangarajan et al. |
| 2008/0181168 A1 | 7/2008 | Han et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0285500 A1 | 11/2008 | Zhang et al. |
| 2008/0299983 A1 | 12/2008 | Kwak et al. |

(56) References Cited

U.S. PATENT DOCUMENTS

| | | |
|---|---|---|
| 2009/0003466 A1 | 1/2009 | Taherzadehboroujeni et al. |
| 2009/0010351 A1 | 1/2009 | Laroia et al. |
| 2009/0017753 A1 | 1/2009 | Kim et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0116420 A1 | 5/2009 | Jeong et al. |
| 2009/0129501 A1 | 5/2009 | Mehta et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0225695 A1 | 9/2009 | Kang et al. |
| 2009/0252078 A1 | 10/2009 | Lim et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9 | 1/2010 | Walton et al. |
| 2010/0002582 A1 | 1/2010 | Luft et al. |
| 2010/0135242 A1 | 6/2010 | Nam et al. |
| 2010/0173644 A1 | 7/2010 | Koyanagi |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0110310 A1 | 5/2011 | Cai |
| 2011/0189946 A1 | 8/2011 | Fukuzawa et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0255518 A9 | 10/2011 | Agrawal et al. |
| 2011/0269394 A1 | 11/2011 | Mildh et al. |
| 2011/0306291 A1 | 12/2011 | Ma et al. |
| 2011/0310814 A1 | 12/2011 | Callard et al. |
| 2012/0002623 A1 | 1/2012 | Khandekar et al. |
| 2012/0044814 A1 | 2/2012 | Natarajan et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2012/0236781 A1 | 9/2012 | Liu et al. |
| 2012/0250603 A1 | 10/2012 | Huang et al. |
| 2012/0307668 A1 | 12/2012 | Wiemann et al. |
| 2013/0016678 A1 | 1/2013 | Laroia et al. |
| 2013/0045674 A1 | 2/2013 | Koyanagi |
| 2013/0070664 A1 | 3/2013 | Nagata et al. |
| 2013/0150047 A1 | 6/2013 | Zhang et al. |
| 2013/0201902 A1 | 8/2013 | Nagata et al. |
| 2013/0208681 A1 | 8/2013 | Gore et al. |
| 2013/0273836 A1 | 10/2013 | Lim et al. |
| 2013/0287138 A1 | 10/2013 | Ma et al. |
| 2013/0315200 A1 | 11/2013 | Gorokhov et al. |
| 2014/0036763 A1 | 2/2014 | Borran et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2540688 | 5/2005 |
| CA | 2577369 | 3/2006 |
| CL | 19931400 | 12/1994 |
| CL | 1997846 | 1/1998 |
| CL | 27102004 | 8/2005 |
| CL | 22892004 | 9/2005 |
| CL | 30862004 | 10/2005 |
| CL | 29932005 | 5/2006 |
| CL | 15212006 | 3/2007 |
| CL | 14922006 | 4/2007 |
| CL | 14892006 | 5/2007 |
| CL | 14902006 | 5/2007 |
| CL | 46151 | 12/2009 |
| CN | 1252919 | 5/2000 |
| CN | 1267437 A | 9/2000 |
| CN | 1284795 | 2/2001 |
| CN | 1296682 | 5/2001 |
| CN | 1344451 A | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1642051 A | 7/2005 |
| CN | 1642335 A | 7/2005 |
| CN | 1647436 | 7/2005 |
| DE | 19800653 A1 | 7/1999 |
| DE | 19800953 C1 | 7/1999 |
| DE | 19957288 C1 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0740431 A1 | 10/1996 |
| EP | 0786889 A1 | 7/1997 |
| EP | 0805576 A2 | 11/1997 |
| EP | 0807989 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 | 4/2001 |
| EP | 1148673 A2 | 10/2001 |
| EP | 1172983 A2 | 1/2002 |
| EP | 1180907 A2 | 2/2002 |
| EP | 1187506 A1 | 3/2002 |
| EP | 1204217 A1 | 5/2002 |
| EP | 1255369 | 11/2002 |
| EP | 1267513 | 12/2002 |
| EP | 1074099 B1 | 2/2003 |
| EP | 1286490 A2 | 2/2003 |
| EP | 1335504 | 8/2003 |
| EP | 1351538 A1 | 10/2003 |
| EP | 1376920 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 | 3/2005 |
| EP | 1531575 A2 | 5/2005 |
| EP | 1533950 A1 | 5/2005 |
| EP | 1538863 A1 | 6/2005 |
| EP | 1542488 | 6/2005 |
| EP | 1601149 A2 | 11/2005 |
| EP | 1643669 | 4/2006 |
| EP | 1898542 A1 | 3/2008 |
| FR | 2584884 | 1/1987 |
| GB | 2276540 A | 1/1995 |
| GB | 2348776 A | 10/2000 |
| GB | 2412541 A | 9/2005 |
| IL | 167573 | 2/2011 |
| IL | 201872 | 5/2012 |
| JP | H04111544 A | 4/1992 |
| JP | 4301931 A | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |

(56) References Cited

FOREIGN PATENT DOCUMENTS

| | | |
|---|---|---|
| JP | 1997182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 A | 12/1998 |
| JP | H11168453 A | 6/1999 |
| JP | 11191756 A | 7/1999 |
| JP | 11196109 A | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000022618 A | 1/2000 |
| JP | 2000102065 A | 4/2000 |
| JP | 2000184425 | 6/2000 |
| JP | 2000511750 A | 9/2000 |
| JP | 2000332724 A | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002111556 A | 4/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 A | 1/2005 |
| JP | 2005502218 T | 1/2005 |
| JP | 2005506757 | 3/2005 |
| JP | 2005110130 A | 4/2005 |
| JP | 2005130491 A | 5/2005 |
| JP | 2005167502 A | 6/2005 |
| JP | 2005197772 | 7/2005 |
| JP | 2005203961 | 7/2005 |
| JP | 2005521327 | 7/2005 |
| JP | 2005521358 | 7/2005 |
| JP | 2005236678 A | 9/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2006524930 A | 11/2006 |
| JP | 2007500486 A | 1/2007 |
| JP | 2007503790 | 2/2007 |
| JP | 2007519281 | 7/2007 |
| JP | 2007520309 A | 7/2007 |
| JP | 2007525043 T | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 B2 | 6/2011 |
| KR | 0150275 B1 | 6/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 | 7/2004 |
| KR | 200471652 | 8/2004 |
| KR | 20040103441 A | 12/2004 |
| KR | 20050063826 A | 6/2005 |
| KR | 100606099 | 7/2006 |
| RU | 95121152 | 12/1997 |
| RU | 2141168 | 11/1999 |
| RU | 2141706 | 11/1999 |
| RU | 2159007 C2 | 11/2000 |
| RU | 2162275 | 1/2001 |
| RU | 2183387 C2 | 6/2002 |
| RU | 2192094 C1 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 | 9/2004 |
| RU | 2238611 C1 | 10/2004 |
| RU | 2242091 C2 | 12/2004 |
| RU | 2250564 | 4/2005 |
| RU | 2257008 | 7/2005 |
| RU | 2267224 | 12/2005 |
| RU | 2005129079 A | 2/2006 |
| RU | 2285338 C2 | 10/2006 |
| RU | 2285351 C2 | 10/2006 |
| RU | 2292655 | 1/2007 |
| RU | 2005106258 | 10/2008 |
| RU | 2349043 C2 | 3/2009 |
| SU | 1320883 | 6/1987 |
| TW | 508960 B | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | WO9408432 | 4/1994 |
| WO | WO-9521494 A1 | 8/1995 |

(56) References Cited

FOREIGN PATENT DOCUMENTS

| | | |
|---|---|---|
| WO | WO-9613920 A1 | 5/1996 |
| WO | WO9701256 | 1/1997 |
| WO | WO9737456 A2 | 10/1997 |
| WO | WO-9746033 A2 | 12/1997 |
| WO | WO-9800946 A2 | 1/1998 |
| WO | WO-9814026 A1 | 4/1998 |
| WO | WO9837706 A2 | 8/1998 |
| WO | WO9848581 A1 | 10/1998 |
| WO | WO9853561 | 11/1998 |
| WO | WO9854919 A2 | 12/1998 |
| WO | WO-9941871 A1 | 8/1999 |
| WO | WO-9944313 A1 | 9/1999 |
| WO | WO-9944383 A1 | 9/1999 |
| WO | WO-9952250 A1 | 10/1999 |
| WO | WO9953713 | 10/1999 |
| WO | 9960729 | 11/1999 |
| WO | WO-9959265 A1 | 11/1999 |
| WO | 0004728 | 1/2000 |
| WO | WO0002397 | 1/2000 |
| WO | WO0033503 | 6/2000 |
| WO | 0041542 | 7/2000 |
| WO | 0051389 A1 | 8/2000 |
| WO | WO0070897 | 11/2000 |
| WO | WO0101596 | 1/2001 |
| WO | WO0117125 A1 | 3/2001 |
| WO | WO0126269 | 4/2001 |
| WO | WO-0139523 A2 | 5/2001 |
| WO | WO0145300 | 6/2001 |
| WO | WO-0148969 A2 | 7/2001 |
| WO | WO-0158054 A1 | 8/2001 |
| WO | WO-0160106 A1 | 8/2001 |
| WO | 0165637 A2 | 9/2001 |
| WO | WO0169814 A1 | 9/2001 |
| WO | WO0182543 | 11/2001 |
| WO | WO-0182544 A2 | 11/2001 |
| WO | WO-0189112 A1 | 11/2001 |
| WO | 0195427 A2 | 12/2001 |
| WO | WO0193505 | 12/2001 |
| WO | WO-0204936 A1 | 1/2002 |
| WO | WO0207375 | 1/2002 |
| WO | 0215432 A1 | 2/2002 |
| WO | WO0215616 | 2/2002 |
| WO | WO-0219746 A1 | 3/2002 |
| WO | WO-0231991 A2 | 4/2002 |
| WO | WO-0233848 A2 | 4/2002 |
| WO | 0245293 A2 | 6/2002 |
| WO | WO0245456 A1 | 6/2002 |
| WO | WO0249305 | 6/2002 |
| WO | WO-0249306 A2 | 6/2002 |
| WO | WO0249385 A2 | 6/2002 |
| WO | WO02060138 | 8/2002 |
| WO | WO02065675 | 8/2002 |
| WO | WO02082689 A2 | 10/2002 |
| WO | WO-02082743 A2 | 10/2002 |
| WO | WO02089434 A1 | 11/2002 |
| WO | WO02093782 A1 | 11/2002 |
| WO | WO02093819 A1 | 11/2002 |
| WO | 02099995 A2 | 12/2002 |
| WO | WO02100027 A1 | 12/2002 |
| WO | WO-03001696 A2 | 1/2003 |
| WO | WO03001761 A1 | 1/2003 |
| WO | WO-03001981 A2 | 1/2003 |
| WO | WO-03003617 A2 | 1/2003 |
| WO | WO03019819 | 3/2003 |
| WO | WO03030414 | 4/2003 |
| WO | WO03034644 A1 | 4/2003 |
| WO | WO03043262 | 5/2003 |
| WO | WO03043369 | 5/2003 |
| WO | 03049409 A2 | 6/2003 |
| WO | 03058871 | 7/2003 |
| WO | 03069816 A2 | 8/2003 |
| WO | WO03067783 | 8/2003 |
| WO | WO03069832 | 8/2003 |
| WO | WO03073646 | 9/2003 |
| WO | WO03075479 | 9/2003 |
| WO | WO03085876 | 10/2003 |
| WO | WO03088538 A1 | 10/2003 |
| WO | WO03094384 | 11/2003 |
| WO | 2004002011 A1 | 12/2003 |
| WO | WO03103331 | 12/2003 |
| WO | WO04002047 | 12/2003 |
| WO | 2004008681 | 1/2004 |
| WO | WO2004004370 | 1/2004 |
| WO | WO2004008671 | 1/2004 |
| WO | WO2004015912 | 2/2004 |
| WO | WO2004016007 | 2/2004 |
| WO | WO2004021605 A1 | 3/2004 |
| WO | WO2004023834 A1 | 3/2004 |
| WO | 2004028037 A1 | 4/2004 |
| WO | WO-2004030238 A1 | 4/2004 |
| WO | WO-2004032443 A1 | 4/2004 |
| WO | 2004038984 A2 | 5/2004 |
| WO | 2004040825 | 5/2004 |
| WO | WO2004038954 | 5/2004 |
| WO | WO-2004038972 A1 | 5/2004 |
| WO | WO-2004038988 A2 | 5/2004 |
| WO | WO-2004040690 A2 | 5/2004 |
| WO | WO-2004040827 A2 | 5/2004 |
| WO | WO2004047354 | 6/2004 |
| WO | WO2004049618 A1 | 6/2004 |
| WO | WO-2004051872 A2 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | 2004073276 | 8/2004 |
| WO | WO2004066520 | 8/2004 |
| WO | WO2004068721 A2 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO-2004086706 A1 | 10/2004 |
| WO | WO-2004086711 A1 | 10/2004 |
| WO | 2004098072 | 11/2004 |
| WO | WO2004095730 A1 | 11/2004 |
| WO | WO-2004095851 A2 | 11/2004 |
| WO | WO2004095854 | 11/2004 |
| WO | WO2004098222 | 11/2004 |
| WO | WO2004102815 | 11/2004 |
| WO | WO2004102816 A2 | 11/2004 |
| WO | 2004114564 A1 | 12/2004 |
| WO | 2004114615 A1 | 12/2004 |
| WO | WO2004105272 A1 | 12/2004 |
| WO | WO2004114549 | 12/2004 |
| WO | 2005002253 | 1/2005 |
| WO | 2005015797 | 2/2005 |
| WO | 2005018270 | 2/2005 |
| WO | WO2005011163 A1 | 2/2005 |
| WO | WO-2005015795 A1 | 2/2005 |
| WO | WO2005015810 | 2/2005 |
| WO | WO-2005015941 A2 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | WO2005032004 A1 | 4/2005 |
| WO | 2005043780 A1 | 5/2005 |
| WO | WO2005043855 | 5/2005 |
| WO | WO2005046080 | 5/2005 |
| WO | 2005055465 A1 | 6/2005 |
| WO | WO2005055484 A1 | 6/2005 |
| WO | WO-2005055527 A1 | 6/2005 |
| WO | WO2005060192 A1 | 6/2005 |
| WO | WO-2005065062 A2 | 7/2005 |
| WO | WO-2005069538 A1 | 7/2005 |
| WO | WO2005074184 | 8/2005 |
| WO | 2005086440 A1 | 9/2005 |
| WO | WO-2005096538 A1 | 10/2005 |
| WO | WO2005122628 | 12/2005 |
| WO | 2006007292 A2 | 1/2006 |

(56) References Cited

FOREIGN PATENT DOCUMENTS

| WO | WO2006019710 | 2/2006 |
|---|---|---|
| WO | WO-2006026344 A1 | 3/2006 |
| WO | WO2006044487 | 4/2006 |
| WO | 2006062356 A1 | 6/2006 |
| WO | 2006069301 | 6/2006 |
| WO | WO2006069300 | 6/2006 |
| WO | WO2006069397 | 6/2006 |
| WO | WO2006077696 | 7/2006 |
| WO | WO-2006096784 A1 | 9/2006 |
| WO | WO-2006099349 A1 | 9/2006 |
| WO | WO-2006099545 A1 | 9/2006 |
| WO | WO-2006099577 A1 | 9/2006 |
| WO | WO-2006127544 A2 | 11/2006 |
| WO | WO-2006134032 A1 | 12/2006 |
| WO | WO-2006138196 A1 | 12/2006 |
| WO | WO-2006138573 A2 | 12/2006 |
| WO | WO2006138581 A2 | 12/2006 |
| WO | 2007022430 A2 | 2/2007 |
| WO | WO-2007024934 A2 | 3/2007 |
| WO | WO-2007024935 A2 | 3/2007 |
| WO | WO2007025160 | 3/2007 |
| WO | WO-2007051159 A2 | 5/2007 |

OTHER PUBLICATIONS

Kishiyama Y et al: "Investigation of Optimum Pilot Channel Structure for VSF-OFCDM Broadband Wireless Access in Forward Link", IEEE Vehicular Technology Conference, New York, NY, US, vol. 4, Apr. 22, 2003, p. 139-144.
International Search Report—PCT/US06/060336—International Search Authority, European Patent Office—Mar. 2, 2007.
Written Opinion—PCT/US06/060336—International Search Authority, European Patent Office—Mar. 2, 2007.
International Preliminary Report on Patentability—PCT/US06/060336—The International Bureau of WIPO—Geneva, Switzerland—Apr. 29, 2008.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Molisch, et al., MIMO systems with antenna selection, IEEE Microwave Magazine, URL: http://ieeexplore.ieee.org/iel5/6668/28677/O1284943.pdf, Retrieved on Dec. 8, 2006, pp. 46-56 (2004).
Wang, et al., "Improving performance of multi-user OFDM systems using bit-wise interleaver" Electronics Letters, IEE Stevenage, GB, vol. 37, No. 19, Sep. 13, 2001, pp. 1173-1174, XP006017222.
Yun, at al., "Performance of an LDPC-Coded Frequency-Hopping OFDMA System Based on Resource Allocation in the Uplink" Vehicular Technology Conference, 2004. VTC 2004-Spring, 2004 IEEE 59th Milan, Italy, May 17-19, 2004, Piscataway, NJ, USA, vol. 4, May 17-19, 2004, pp. 1926-1928, XF010766497.
International Search Report and Written Opinion—PCT/US09/064871, International Searching Authority—European Patent Office, Feb. 17, 2010.
3GPP TS 33.220 V.1.1.0 XX,XX, "3rd Generation Partnership Projects; Technical Specification Group Services and System Aspects; Generic Authentication Architecture (GAA); Generic Bootstrapping Architecture (Release 6)" Feb. 9, 2004, pp. 1-17, figure 4, XP002996023.
3rd Generation Partnership Project; Technical Specification Group Radio Access Network; Physical Layer Aspects for Evolved UTRA (Release 7), 3GPP TR 25.814 v0.3.1 (Nov. 2005).
B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 104-105.
Bahai, Saltzberg: "System Architecture," Multi-Carrier Digital Communications, Kluwer Academic, New York, NY, XP-002199501, 1999, pp. 17-21.
Bingham: "Other Types of MCM," ADSL, VDSL, and Multicarrier Modulation, John wiley & Sons, New York, XP-002199502. 2000, pp. 111-113.
Carl R. Nassar, Balasubramaniam Natarajan and Steve Shattil: Introduction of Carrier Interference to Spread Spectrum Multiple Access, Apr. 1999, IEEE, pp. 1-5.
Chennakeshu, et al. "A Comparison of Diversity Schemes for a Mixed-Mode Slow Frequency-Hopped Cellular System," IEEE, 1993, pp. 1749-1753.
Chennakeshu, et al. "Capacity Analysis of a TDMA-Based Slow-Frequency-Hopped Cellular System," IEEE Transaction on Vehicular Technology, vol. 45., No. 3 Aug. 1996, pp. 531-542.
Chiani, et al. "Outage Evaluation for Slow Frequency-Hopping Mobile Radio Systems" IEEE Transactions on Communications, vol. 47, No. 12, pp. 1865-1874, Dec. 1999.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Das, Arnab, et al. "Adaptive, asynchronous incremental redundancy (A-IR) with fixed transmission time intervals TTI for HSDPA." IEEE, pp. 10-83-1087.
Das, et al. "On the Reverse Link Interference Structure for Next Generation Cellular Systems," European Microwave Conference, Oct. 11, 2004, pp. 3068-3072.
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1, 2, 91-93.
Dinis, et al., "A Multiple Access Scheme for the Uplink of Broadband Wireless Systems," IEEE Global Telecommunications Conference, 2004, GLOBECOM '04, vol. 6, Nov. 29-Dec. 3, 2004, pp. 3808-3812.
Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, 2005, Proceedings, Philadelphia, PA, pp. 1121-1124.
Groe, et al., "CDMA Mobile Radio Design," Sep. 26, 2001, Artech House, Norwood, MA 02062, pp. 257-259.
Hermann Rohling et al., : "Performance Comparison of Different Multiple Access Schemes For the Downlink of an OFDM Communication System", Vehicular Technology Conference, 1997, 47th IEEE, vol. 3, May 4-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
J.S. Chow and J.M. Cioffi: "A cost-effective maximum likelihood reciever for multicarrier systems", Proc. IEEE Int. Conf. On Comm., pp. 948-952, Jun. 1992.
Je, et al. "A Novel Multiple Access Scheme for Uplink Cellular Systems," IEEE Vehicular Technology Conference, Sep. 26, 2004 pp. 984-988.
John B. Groe, Lawrence E. Larson, "CDMA Mobile Radio Design" Sep. 26, 2001, Artech House, Norwood, MA02062 580530, XP002397967, pp. 157-159.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.1., "Programmable Demultiplexer/Demodulator Processor," COMSAT Laboratories, IEEE, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.

(56) References Cited

OTHER PUBLICATIONS

Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Kim, et al. "Performance of TDMA System With SFH and 2-Bit Differentially Detected GMSK Over Rayleigh Fading Channel," IEEE Vehicular Technology Conference, Apr. 28, 1996, pp. 789-793.
Kostic, et al. "Dynamic Frequency Hopping in Wireless Cellular Systems-Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Naofal Al-Dhahir: "A Bandwidth-Optimized Reduced-Complexity Equalized Multicarrier Transceiver", IEEE Transactions on Communications, vol. 45, No. 8, Aug. 1997.
Naofal Al-Dhahir: "Optimum Finite-Length Equalization for Multicarrier Transceivers", IEEE Trans. On Comm., pp. 56-64, Jan. 1996.
Nassar, Carl R., et al., "High-Performance MC-CDMA via Carrier Interferometry Codes", IEEE Transactions on Vehicular Technology, vol. 50, No. 6, Nov. 2001.
Net Working Group, T. Dierks, C. Allen, Certicom; The TLS Protocol Version 1.0; Jan. 1999.
NTT DoCoMo, et al.: "Orthogonal Common Pilot Channel and Scrambling Code in Evolved UTRA Downlink," 3GPP TSG RAN WG1 #42 on LTE, pp. 1-8 (Aug.-Sep. 2005).
Sari, et al., "Transmission Techniques for Digital Terrestrial TV Broadcasting," IEEE Communications Magazine, Feb. 1995, pp. 100-109.
Schnell, et al, "Application of IFDMA to Mobile Radio Transmission," IEEE 1998 International Conference on Universal Personal Communications, vol. 2, Oct. 5-9, 1998, pp. 1267-1272.
Schnell, et al., "A Promising New Wideband Multiple-Access Scheme for Future Mobile Communications Systems," European Transactions on Telecommunications, Wiley & Sons, Chichester, GB, vol. 10, No. 4, Jul. 1999, pp. 417-427.
Shattil et al., "Array Control Systems for Multicarrier Protocols Using a Frequency-Shifted Feedback Cavity", IEEE, 1999.
Sklar: "Formatting and Baseband Transmission", Chapter 2, pp. 54, 104-106, Jan. 2001.
Sorger U. et al., : "Interleave FDMA-a new spread-spectrum multiple-access scheme", IEEE Int. Conference on Atlanta, GA, USA Jun. 7-11, 1998, XP010284733.
Tellado, "Multicarrier Modulation with Low Par," Kluwer Academic, Dordrecht, NL, XP-002199500, 2000, pp. 6-11 and 55-60.
Tellambura, "Use of m-sequences for OFDM Peak-to-Average Power Ratio Reduction," Electronics Letters, vol. 33, No. 15, Jul. 17, 1997, pp. 1300-1301.
TIA/EIA/IS-2000 "Standards for CDMA2000 Spread Spectrum Systems" Version 1.0 Jul. 1999.
TIA/EIA/IS-95 "Mobile Station-Base Station Compatibility Standard for Dual-Mode Wideband Spread Spectrum Cellular System" Jul. 1993.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik, J.: "MBFDD and MBTDD Wideband Mode: Technology Overview," IEEE 802.20 Working Group Mobile Broadband Wireless Access, Jan. 2006, pp. 1-109, XP002429968.
Tomcik, J.: "QFDD Technology Overview Presentation," IEEE 802.20 Working Group on Mobile Broadband Wireless Access, Slides/pp. 1-73, Nov. 15, 2005 and Oct. 28, 2005.
Torrieri, "Cellular Frequency-Hopping CDMA Systems," IEEE Vehicular Technology Conference, May 16, 1999, pp. 919-925.
Toufik I et al., "Channel allocation algorithms for multi-carrier systems", Vehicular Technology Conference, 2004. VTC2004-Fall. 2004 IEEE 60th Los Angeles, CA, USA Sep. 26-29, 2004, pp. 1129-1133, XP010786798, ISBN: 07-7803-8521-7.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Zekri, et al., "DMT Signals with Low Peak-to-Average Power Ratio," Proceedings, IEEE International Symposium on Computers and Communications, 1999, Jul. 6-8, 1999, pp. 362-368.
S. Nishimura et al., "Downlink Null-Formation Using Receiving Antenna Selection in MIMO/SDMA", Technical Search Report of Electric Information Communication Academic Conference, Feb. 28, 2002, vol. 101, No. 683, pp. 17-22, RCS 2001-286.
Chiani, et al. "Outage Evaluation for Slow Frequency-Hopping Mobile Radio Systems" IEEE Transactions on Communications, vol. 47, No. 12, Dec. 1999, pp. 1865-1874.
European Search Report—EP10008767, Search Authority—Berlin Patent Office, Sep. 24, 2010.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-8.
Qualcomm Europe: "Description and link simulations for OFDMA based E-UTRA uplink" 3GPP Draft; R1-051100, 3rd Generation Partnership Project (3GPP), Mobile Competence Centre; 650, Route Des Lucioles; F-06921 Sophia-Antipolis Cedex; France, vol. RAN WG1, No. San Diego, USA; Oct. 4, 2005, pp. 1-10, XP050100715 [retrieved on Oct. 4, 2005.
Schnell et al., "Application of IFDMA to Mobile Radio Transmission", IEEE 1998 International Conference on Universal Personal Communications, vol. 2, Oct. 5-9, 1998, pp. 1267-1272.
Blum, R. et al: "On Optimum MIMO with Antenna Selection," IEEE International Conference on Communications: Conference Proceedings, vol. 1, Apr. 28, 2002, pp. 386-390.
Catreux, S. et al.: "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/iel5/7153/19260/00891306.pdf?tp=&isnumber=19260&arnumber=8913063&punumber=7153.
Chung, S. et al.: "Low complexity algorithm for rate and power quantization in extended V-Blast" VTC Fall 2001. IEEE 54th. Vehicular Technology Conference Proceedings. Atlantic City, NJ, Oct. 7-11, 2001, vol. 1 of 4, pp. 910-914, Conf. 54.

(56) References Cited

OTHER PUBLICATIONS

El Gamal, H. et al.: "Universal Space-Time Coding," IEEE Transactions on Information Theory, vol. 49, Issue 5, pp. 1097-1119, XP011074756, ISSN: 0018-9448, May 2003.
European Search Report—EP10011743, Search Authority—Munich Patent Office, Dec. 20, 2010.
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kousa, M. et al: "Adaptive Binary Coding for Diversity Communication Systems" IEEE International Conference on Personal Wireless Communications Proceedings, pp. 80-84, XP000992269, (1997).
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
Prasad, N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Translation of Office Action in Chinese Application 2006800295980 corresponding to U.S. Appl. No. 11/260,895, citing CN1346221 and CN1383631 dated Feb. 16, 2011.
Translation of Office Action in Japan application 2008-538193 corresponding to U.S. Appl. No. 11/261,065, citing JP11196109, JP10322304 and JP9008725 dated Mar. 8, 2011.
Translation of Office Action in Korean application 10-2007-7031029 corresponding to U.S. Appl. No. 11/260,931, citing US20030202491 and KR20040063057 dated Jan. 28, 2011.
Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048832.4 corresponding to U.S. Appl. No. 11/261,158, citing CN1132474 dated Dec. 31, 2010.
Translation of Office Action in Japanese Application 2008-514880 corresponding to U.S. Appl. No. 11/445,377, citing JP2007519281 and JP2006505172 dated Nov. 9, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese Application 2008-529216 corresponding to U.S. Appl. No. 11/261,159, citing GB2348776, WO2004098222, WO2005065062 and WO2004102815. Dated Jan. 11, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Widdup, B. et al., "A highly-parallel VLSI architecture for a list sphere detector," IEEE International Conference, Paris, France, vol. 5, pp. 2720-2725 (2004).
Wiesel, A. et al.: "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.
Yongmei Dai,; Sumei Sun; Zhongding Lei; Yuan Li.: "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54, 104-106.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Alcatel-Lucent, et al., "Dedicated Reference Signals for Precoding in E-UTRA Downlink" 3GPP Draft; R1-071718, 3rd Generation Partnership Project (3GPP), Mobile Competence Centre; 650, Route Des Lucioles; F-06921 Sophia-Antipolis Cedex; France, vol. RAN WG1, No. St. Julian; Apr. 3, 2007, XP050105640 [retrieved on Apr. 3, 2007].
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Ken Murakami et al., "Status Toward Standardization at IEEE 802.3ah and items on the construction of GE-PON system ," Technical Report of the Institute of Electronics, Information and Communication Engineers, Jun. 13, 2003, vol. 103, No. 124, pp. 1-6, IN2003-24.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Siemens, "Evolved UTRA uplink scheduling and frequency reuse" [online], 3GPP TSG-RAN WG1 #41 R1-050476, Internet <URL:http://www.3gpp.org/ftp/tsg_ran/WG1_RL1/TSGR1_41/Docs/R1-050476.zip>, May 9, 2005.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Miorandi D., et al., "Analysis of master-slae protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.

(56) References Cited

OTHER PUBLICATIONS

Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nfo/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL, http://www.ieee802.org/20/contribs/c802.20-05-68.zip.
Nokia: "Compact signalling of multi-code allocation for HSDPA", version 2, 3GPP R1-02-0018, Jan. 11, 2002.
Sethi M, et al., "Code Reuse DS-CDMA-A Space Time Approach", Proceedings of the 2002 IEEE International Conference on Acoustics, Speech, and Signal Processing (ICASSP), pp. 2297-2300, May 13-17, 2002.
Bhushan N., "UHDR Overview", C30-20060522-037, Denver, CO, May 22, 2006, pp. 1-115.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/DOCS/ [retrieved on Feb. 7, 2012].
Samsung: "Uplink Transmission and Multiplexing for EUTRA", 3GPP Draft; R1-050605 UL Multiplexing, Jun. 16, 2005, XP050111420.
Digital cellular telecommunications system (Phase 2+); General Packet Radio Service (GPRS); Mobile Station (MS)-Base Station System (BSS)interface; Radio Link Control/Medium Access Control (RLC/MAC) protocol (GSM 04.60 version 8.4.1 Release 1999), 3GPP Standard; ETSI EN 301 349, 3rd Generation Partnership Project (3GPP), Mobile Competence Centre; 650, Route Des Lucioles; F-06921 Sophia-Antipolis Cedex; France, No. V8.4.1, Oct. 1, 2000, pp. 1-243, XP050358534.
Tomcik J., "QFDD and QTDD: Proposed Draft Air Interface Specification," IEEE C802.20-05/69, IEEE 802.20 Working Group on Mobile Broadband Wireless Access, Oct. 28, 2005, p. 1-6,1-7,1-16,6-65,7-11,7-33,7-37-7-55,9-21,9-22,9-24-9-32.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA, IEEE, US, vol. 3, Sep. 19, 1999, pp. 1545-1549, XP010353233, DOI: 10.1109/VETECF.1999.801553, ISBN: 978-0-7803-5435-7.
Zhang H., "A new space-time-frequency Mimo-Ofdm scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

\* cited by examiner

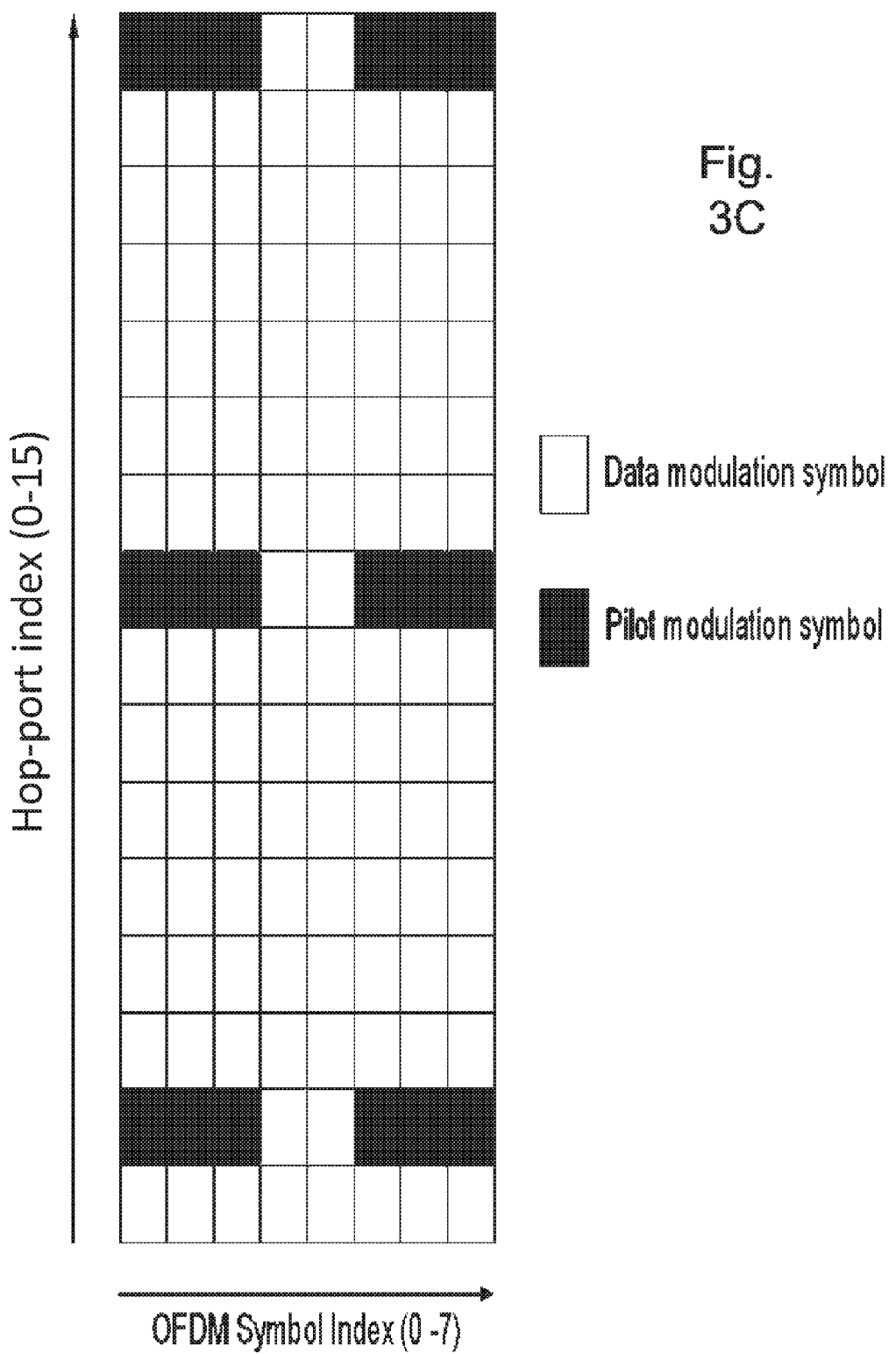

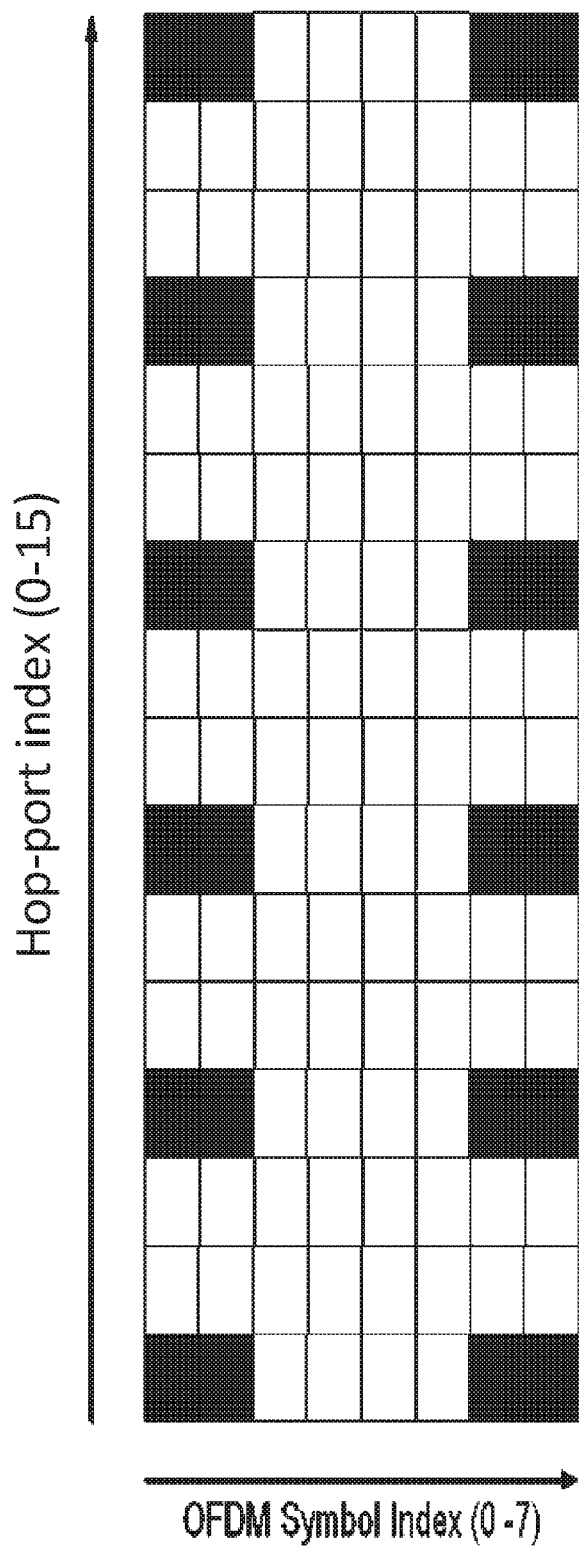

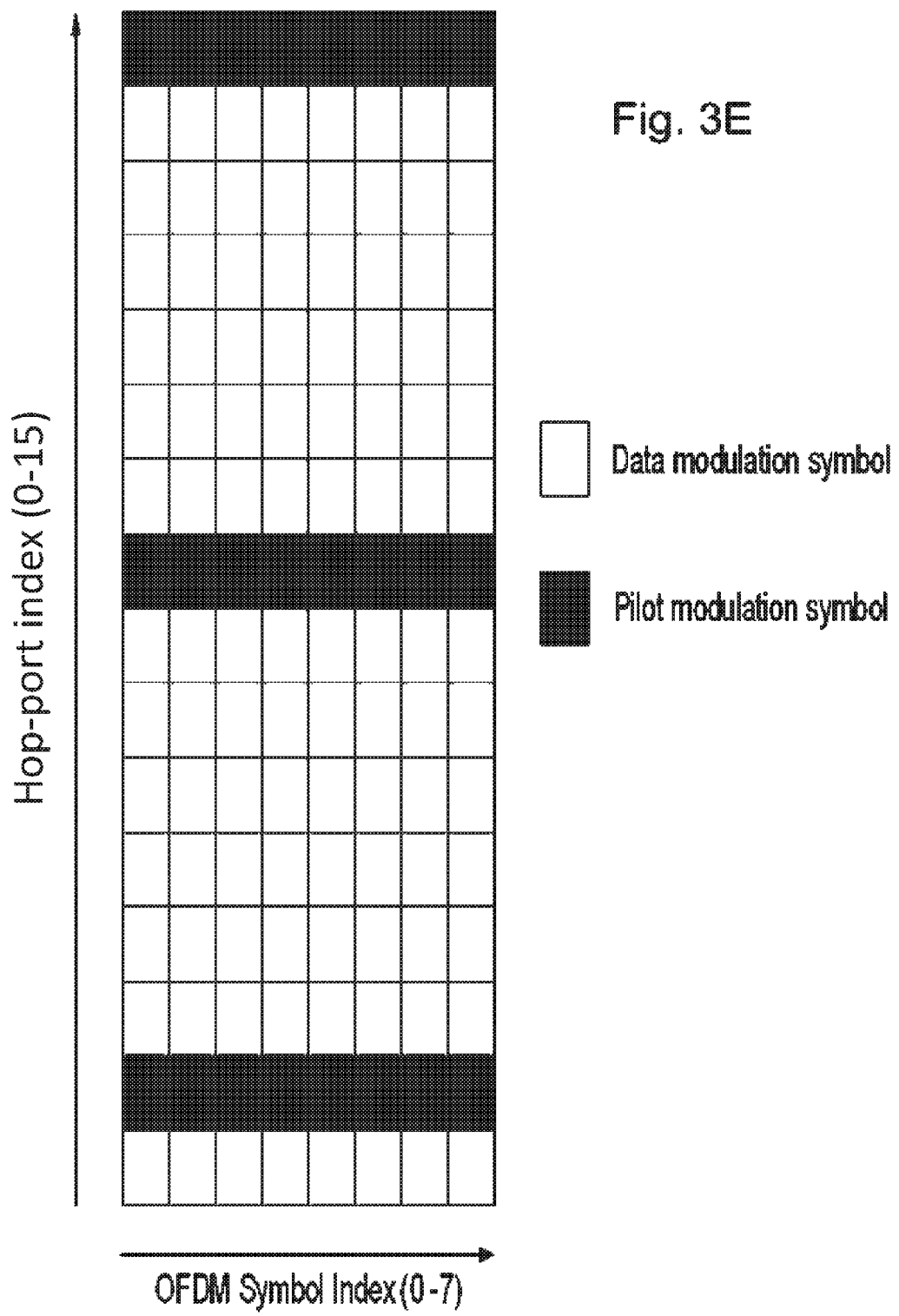

PILOT SIGNAL TRANSMISSION FOR AN ORTHOGONAL FREQUENCY DIVISION WIRELESS COMMUNICATION SYSTEM

CLAIM OF PRIORITY UNDER 35 U.S.C. §120

The present Application for Patent is a continuation-in-part and claims priority to patent application Ser. No. 11/083,693 entitled "PILOT SIGNAL TRANSMISSION FOR AN ORTHOGONAL FREQUENCY DIVISION WIRELESS COMMUNICATION SYSTEM" filed Mar. 17, 2005, pending, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Systems And Methods For Control Channel Signaling" 11/261,836, filed concurrently herewith, assigned to the assignee hereof, and expressly incorporated by reference herein; and "Method And Apparatus For Providing Antenna Diversity In A Wireless Communication System" 11/261,823, filed concurrently herewith, assigned to the assignee hereof, and expressly incorporated by reference herein.

BACKGROUND

I. Field

The present document relates generally to wireless communication and amongst other things pilot information transmission in an orthogonal frequency division wireless communication system.

II. Background

An orthogonal frequency division multiple access (OFDMA) system utilizes orthogonal frequency division multiplexing (OFDM). OFDM is a multi-carrier modulation technique that partitions the overall system bandwidth into multiple (N) orthogonal frequency subcarriers. These subcarriers may also be called tones, bins, and frequency channels. Each subcarrier is may be modulated with data. Up to N modulation symbols may be sent on the N total subcarriers in each OFDM symbol period. These modulation symbols are converted to the time-domain with an N-point inverse fast Fourier transform (IFFT) to generate a transformed symbol that contains N time-domain chips or samples.

In a frequency hopping communication system, data is transmitted on different frequency subcarriers in different time intervals, which may be referred to as "hop periods." These frequency subcarriers may be provided by orthogonal frequency division multiplexing, other multi-carrier modulation techniques, or some other constructs. With frequency hopping, the data transmission hops from subcarrier to subcarrier in a pseudo-random manner. This hopping provides frequency diversity and allows the data transmission to better withstand deleterious path effects such as narrowband interference, jamming, fading, and so on.

An OFDMA system can support multiple mobile stations simultaneously. For a frequency hopping OFDMA system, a data transmission for a given mobile station may be sent on a "traffic" channel that is associated with a specific frequency hopping (FH) sequence. This FH sequence indicates the specific subcarrier to use for the data transmission in each hop period. Multiple data transmissions for multiple mobile stations may be sent simultaneously on multiple traffic channels that are associated with different FH sequences. These FH sequences may be defined to be orthogonal to one another so that only one traffic channel, and thus only one data transmission, uses each subcarrier in each hop period. By using orthogonal FH sequences, the multiple data transmissions generally do not interfere with one another while enjoying the benefits of frequency diversity.

An accurate estimate of a wireless channel between a transmitter and a receiver is normally needed in order to recover data sent via the wireless channel. Channel estimation is typically performed by sending a pilot from the transmitter and measuring the pilot at the receiver. The pilot signal is made up of pilot symbols that are known a priori by both the transmitter and receiver. The receiver can thus estimate the channel response based on the received symbols and the known symbols.

Part of each transmission from any particular mobile station to the base station, often referred to as a "reverse link" transmission, during a hop period is allocated to transmitting pilot symbols. Generally, the number of pilot symbols determines the quality of channel estimation, and hence the packet error rate performance. However, the use of pilot symbols causes a reduction in the effective transmission data rate that can be achieved. That is, as more bandwidth is assigned to pilot information, less bandwidth becomes available to data transmission.

One type of FH-OFDMA system is a blocked hop system where multiple mobile stations are assigned to a contiguous group of frequencies and symbol periods. In such a system, it is important that pilot information be reliably received from the mobile station, while at the same time reducing the bandwidth that is allocated to pilot information, since the block has a limited amount of symbols and tones available to be used for both pilot and data transmission.

SUMMARY

In an embodiment, pilot symbol patterns are provided for pilot symbols transmitted from a mobile station or a base station. The pattern allows for improved receipt and demodulation of the pilot symbols transmitted. The selection of the pilot patterns may be based upon a frequency selectivity of the user and a frequency selective threshold.

In additional embodiments, schemes for improving the ability to multiplex pilot symbols without interference and/or biasing from different mobile stations in a same sector of a base station over the same frequencies and in the same time slots in an OFDM system are provided.

In further embodiments, schemes for reducing the bias or interference for pilot symbols transmitted from different mobile stations in neighboring cells over the same frequencies and in the same time slots in an OFDM system are provided.

In other embodiments, methods for altering pilot symbol patterns are provided. Also, in other further embodiments methods for generating pilot symbols are provided.

BRIEF DESCRIPTION OF THE DRAWINGS

The features, nature, and advantages of the present embodiments may become more apparent from the detailed description set forth below when taken in conjunction with the drawings in which like reference characters identify correspondingly throughout and wherein:

FIGS. 3C-3E illustrate block diagrams of pilot assignment schemes according to further embodiments;

DETAILED DESCRIPTION

Figure 1:
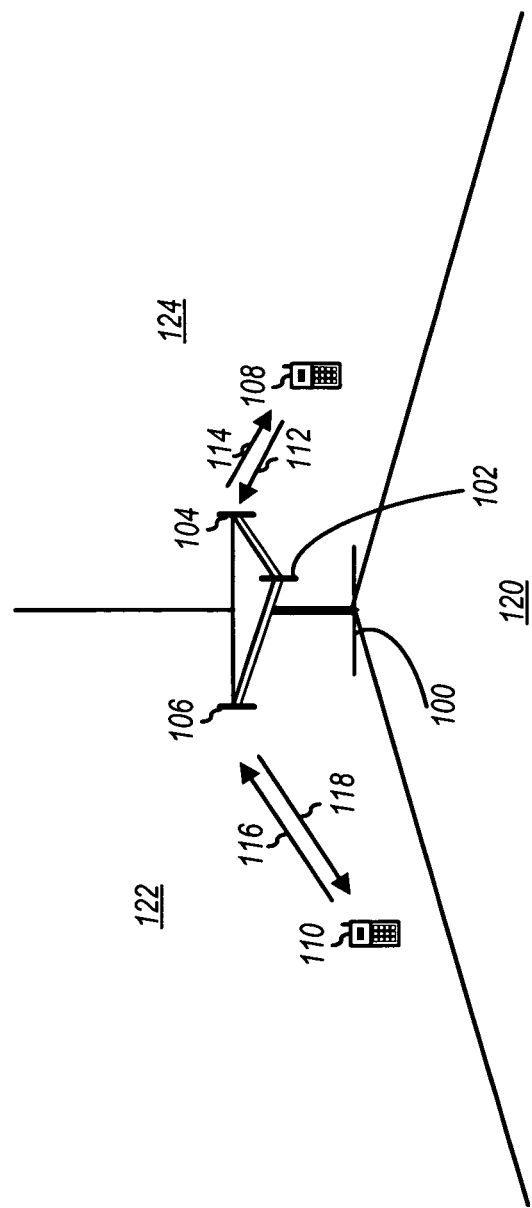
FIG. 1 illustrates a multiple access wireless communication system according to an embodiment.

Referring to FIG. 1, a multiple access wireless communication system according to an embodiment is illustrated. A base station 100 includes multiple antenna groups 102, 104, and 106 each including one or more antennas. In FIG. 1, only antenna is shown for each antenna group 102, 104, and 106, however, multiple antennas may be utilized for each antenna group that corresponds to a sector of base station 100. Mobile station 108 is in communication with antenna 104, where antenna 104 transmits information to mobile station 108 over forward link 114 and receives information from mobile station 108 over reverse link 112. Mobile station 110 is in communication with antenna 106, where antenna 106 transmits information to mobile station 110 over forward link 118 and receives information from mobile station 110 over reverse link 116.

Each group of antennas 102, 104, and 106 and/or the area in which they are designed to communicate is often referred to as a sector of the base station. In the embodiment, antenna groups 102, 104, and 106 each are designed to communicate to mobile stations in a sector, sectors 120, 122, and 124, respectively, of the areas covered by base station 100.

A base station may be a fixed station used for communicating with the terminals and may also be referred to as an access point, a Node B, or some other terminology. A mobile station may also be called a mobile station, a user equipment (UE), a wireless communication device, terminal, access terminal or some other terminology.

Figure 2:
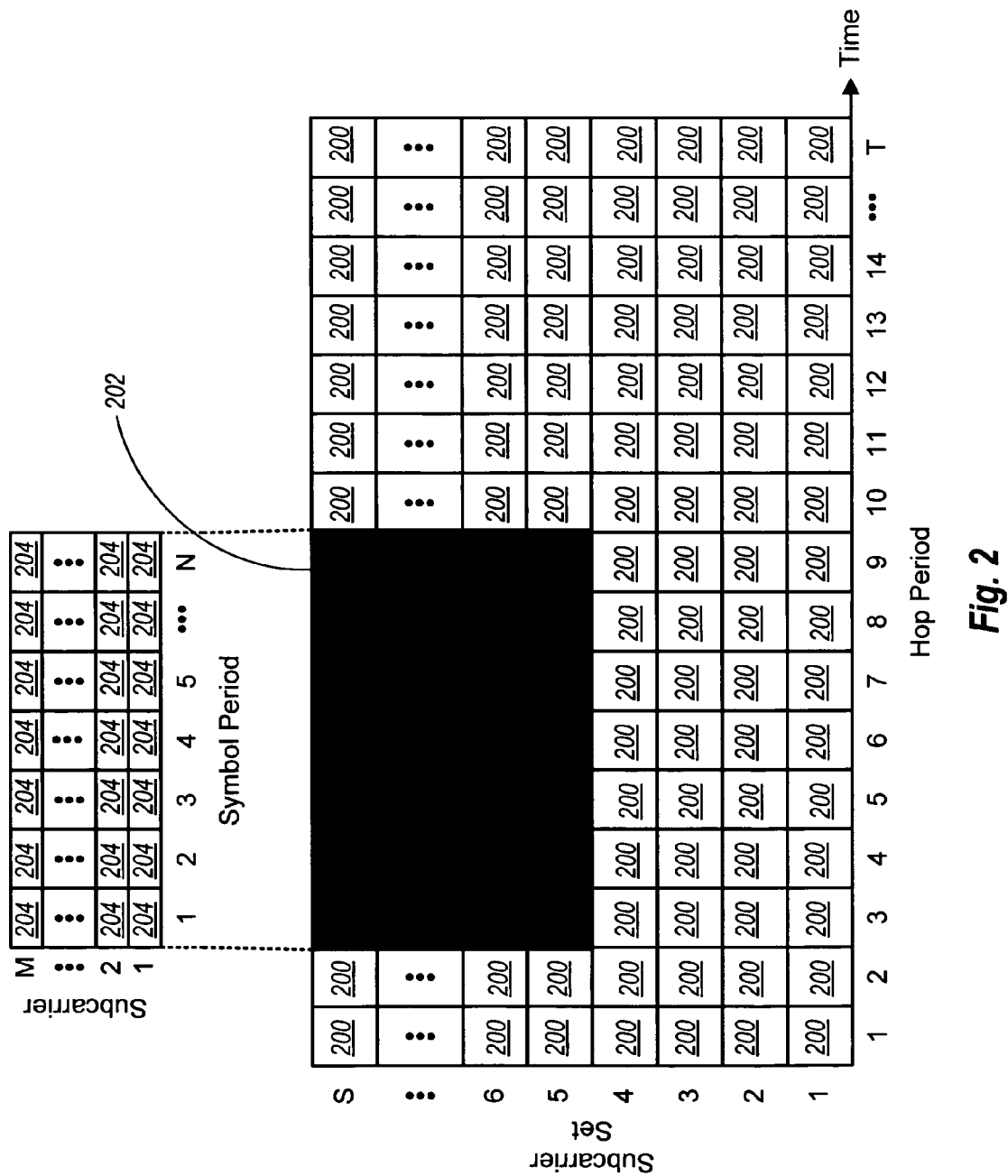
FIG. 2 illustrates a spectrum allocation scheme for a multiple access wireless communication system according to an embodiment.

Referring to FIG. 2, a spectrum allocation scheme for a multiple access wireless communication system is illustrated. A plurality of OFDM symbols 200 is allocated over T symbol periods and S frequency subcarriers. Each OFDM symbol 200 comprises one symbol period of the T symbol periods and a tone or frequency subcarrier of the S subcarriers.

In an OFDM frequency hopping system, one or more symbols 200 may be assigned to a given mobile station. In an embodiment of an allocation scheme as shown in FIG. 2, one or more hop regions, e.g. hop region 202, of symbols to a group of mobile stations for communication over a reverse link. Within each hop region, assignment of symbols may be randomized to reduce potential interference and provide frequency diversity against deleterious path effects.

Each hop region 202 includes symbols 204 that are assigned to the one or more mobile stations that are in communication with the sector of the base station and assigned to the hop region. In other embodiments, each hop region is assigned to one or more mobile stations. During each hop period, or frame, the location of hop region 202 within the T symbol periods and S subcarriers varies according to a hopping sequence. In addition, the assignment of symbols 204 for the individual mobile stations within hop region 202 may vary for each hop period.

The hop sequence may pseudo-randomly, randomly, or according to a predetermined sequence, select the location of the hop region 202 for each hop period. The hop sequences for different sectors of the same base station are designed to be orthogonal to one another to avoid "intra-cell" interference among the mobile station communicating with the same base station. Further, hop sequences for each base station may be pseudo-random with respect to the hop sequences for nearby base stations. This may help randomize "inter-cell" interference among the mobile stations in communication with different base stations.

In the case of a reverse link communication, some of the symbols 204 of a hop region 202 are assigned to pilot symbols that are transmitted from the mobile stations to the base station. The assignment of pilot symbols to the symbols 204 should preferably support space division multiple access (SDMA), where signals of different mobile stations overlapping on the same hop region can be separated due to multiple receive antennas at a sector or base station, provided enough difference of spatial signatures corresponding to different mobile stations. To more accurately extract and demodulate signals of different mobile stations, the respective reverse link channels should be accurately estimated. Therefore, it may be desired that pilot symbols on the reverse link enable separating pilot signatures of different mobile stations at each receive antenna within the sector in order to subsequently apply multi-antenna processing to the pilot symbols received from different mobile stations.

Block hopping may be utilized for both the forward link and the reverse link, or just for the reverse link depending on the system. It should be noted that while FIG. 2 depicts hop region 200 having a length of seven symbol periods, the length of hop region 200 can be any desired amount, may vary in size between hop periods, or between different hopping regions in a given hop period.

It should be noted that while the embodiment of FIG. 2 is described with respect to utilizing block hopping, the location of the block need not be altered between consecutive hop periods or at all.

Figure 3A:
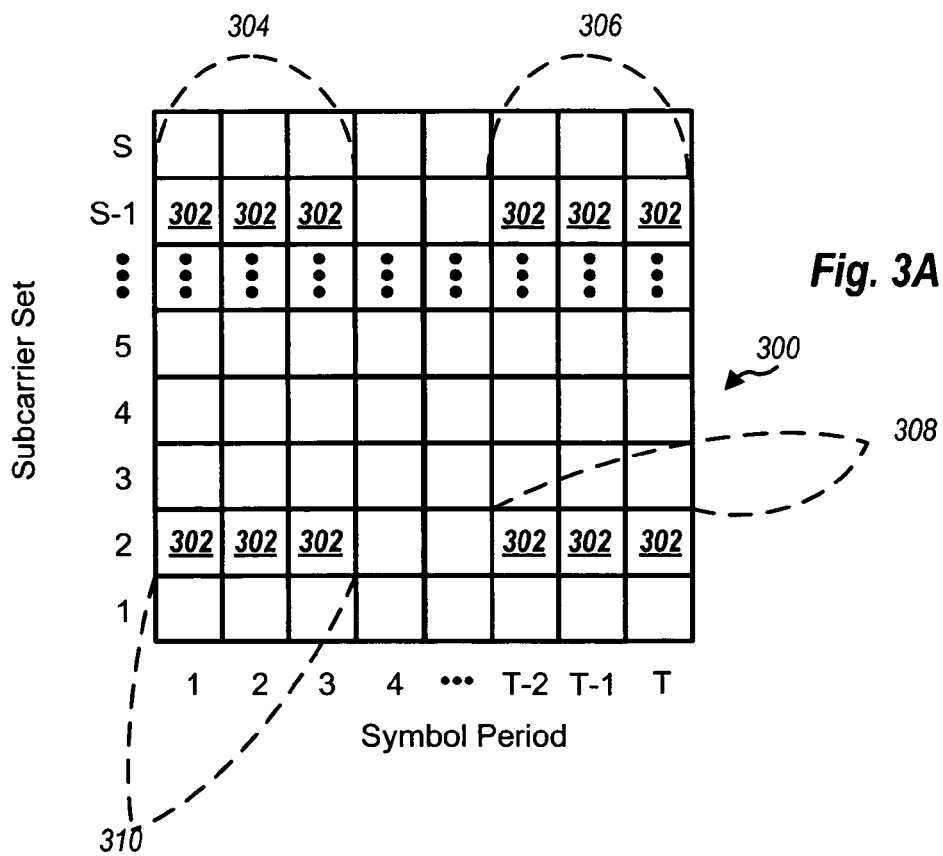
FIG. 3A illustrates a block diagram of a pilot assignment scheme according to an embodiment.
Figure 3B:
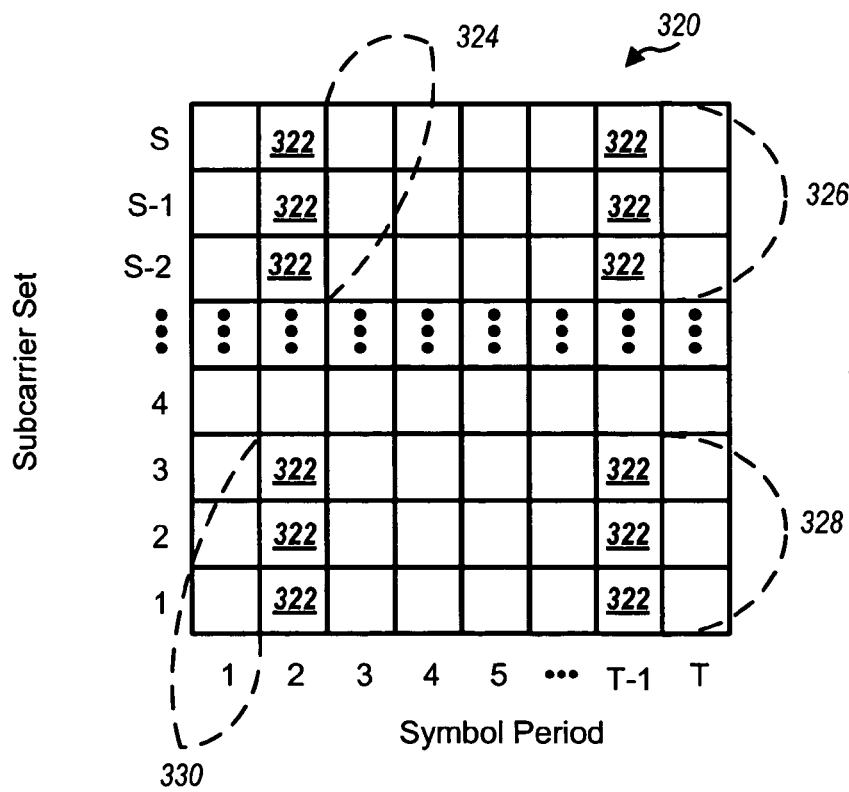
FIG. 3B illustrates a block diagram of a pilot assignment scheme according to another embodiment.

Referring to FIGS. 3A and 3B, block diagrams of pilot assignment schemes according to several embodiments are illustrated. Hop regions 300 and 320 are defined by T symbol periods by S subcarriers or tones. Hop region 300 includes pilot symbols 302 and hop region 320 includes pilot symbols 322, with the remaining symbols periods and tone combinations available for data symbols and other symbols. In an embodiment, pilot symbol locations for each hop regions, i.e. a group of $N_S$ contiguous tones over $N_T$ consecutive OFDM symbols, should have pilot tones located close to the edges of the hop region. This is generally because typical channels in wireless applications are relatively slow functions of time and frequency so that a first order approximation of the channel, e.g. a first order Taylor expansion, across the hop region in time and frequency provides information regarding channel conditions that is sufficient to estimate the channel for a given mobile station. As such, it is preferred to estimate a pair of channel parameters for proper receipt and demodulation of symbols from the mobile stations, namely the constant component of the channel, a zero order term of a Taylor expansion, and the linear component, a first order term Taylor expansion, of the channel across the time and frequency span of the channel. Generally estimation accuracy of the constant component is independent of pilot placement. The estimation accuracy of the linear component is generally preferably achieved with pilot tones located at the edges of the hop region.

Pilot symbols 302 and 322 are arranged in contiguous pilot symbol clusters 304, 306, 308, and 310 (FIG. 3A) and 324, 326, 328, and 330 (FIG. 3B). In an embodiment, each cluster 304, 306, 308, and 310 (FIG. 3A) and 324, 326, 328, and 330 (FIG. 3B) within a hop region, has a fixed number, and often the same number, of pilot symbols within a given hop region. The utilization of clusters 304, 306, 308, and 310 (FIG. 3A) and 324, 326, 328, and 330 (FIG. 3B) of contiguous pilot symbols may, in an embodiment take into account the effect of a multi-user interference caused by inter-carrier interference which results from high Doppler and/or symbol delay spreads. Further, if pilot symbols from mobile stations scheduled on a same hop region are received at substantially different power levels, signals of a stronger mobile station may create a significant amount of interference for a weaker mobile station. The amount of interference is higher at the edges, e.g. subcarrier 1 and subcarrier S, of the hop region and also at the edge OFDM symbols, e.g. symbol periods 1 and T, when the leakage is caused by excess delay spread, i.e. when the portion of channel energy concentrated in the taps that exceed cyclic prefix of the OFDM symbols becomes significant. Therefore, if pilot symbols are located exclusively at the edges of a hop region there may be degradation in channel estimation accuracy and a bias in interference estimation. Hence, as depicted in FIGS. 3A and 3B pilot symbols are placed close to the edges of the hop region, however, avoiding the situation where all the pilot symbols are at the edges of the hop region.

Referring to FIG. 3A, a hop region 300 is comprised of pilot symbols 302. In the case of channels with a pronounced frequency selectivity rather than time selectivity, pilot symbols 302 are located in contiguous pilot symbol clusters 304, 306, 308, and 310 with each pilot symbol cluster 304, 306, 308, and 310 spanning a multiple symbol periods and one frequency tone. The frequency tone is preferably chosen to be close to the edges of the frequency range of the hop region 300, however, not exactly at the edge. In the embodiment of FIG. 3A, none of the pilot symbols 302 in a given cluster are at the edge frequency tones and in each cluster only pilot symbol may be at an edge symbol period.

One rationale behind a "horizontal" shape of the contiguous pilot symbol clusters of pilot symbols 302 is that, for channels with higher frequency selectivity, the first order (linear) component may be stronger in the frequency domain than in the time domain.

It should be noted that one or more pilot symbols in each cluster, in the embodiment of FIG. 3A, may be at a different tone than one or more pilot symbols in a different cluster. For example, cluster 304 may be at tone S and cluster 306 may be at tone S-1.

Referring to FIG. 3B, in the case of channels with a pronounced time selectivity rather than frequency selectivity, pilot symbols 322 are arranged in clusters 324, 326, 328, and 330 of contiguous pilot symbols that each span multiple frequency tones but have a same symbol period of hop region 320. OFDM symbols at the edges of hop region 320, those that have a maximum tone, e.g. tone S, or minimum tone, e.g. tone 1, of the frequency range that defines the S subcarriers, may be included as part of the pilot symbols, since there may be pilot symbols 322 that are at the edges of the hop region 320. However, in the embodiment shown in FIG. 3B, only one pilot symbol in each cluster may be assigned to the maximum or minimum frequency subcarrier.

In the embodiment depicted in FIG. 3B, a channel with higher time selectivity may have a typical pattern that may be obtained by a 90° rotation of the pattern chosen for channels with higher frequency selectivity (FIG. 3A).

It should be noted that one or more pilot symbols in each cluster, in the embodiment of FIG. 3B, may be assigned to a different symbol period than one or more pilot symbols in a different cluster. For example, cluster 324 may be at different symbol period T than cluster 326.

Additionally, as depicted in the embodiments of FIGS. 3A and 3B, pilot patterns are provided so that the clusters, 304, 306, 308, and 310 (FIG. 3A) and 324, 326, 328, and 330 (FIG. 3B), are preferably symmetric with respect to the center of the hop region. The symmetry of the clusters with respect to the center of the hop region may provide improved simultaneous estimation of the channel with respect to time and frequency responses of the channel.

It should be noted that while FIGS. 3A and 3B depict four clusters of pilot symbols per hop region, a fewer or greater amount of clusters may be utilized in each hop region. Further, the number of pilot symbols per pilot symbol cluster may also vary. The total number of pilot symbols and pilot symbol clusters are a function of the number of pilot symbols required by the base station to successfully demodulate data symbols received on the reverse link and to estimate the channel between the base station and the mobile station. Also, each cluster need not have the same number of pilot symbols. The number of mobile stations that can be multiplexed over a single hop region can, in an embodiment, be equal to the number of pilot symbols in a hop region.

In addition, while FIGS. 3A and 3B depict pilot symbol clusters designed either for channels having frequency selectivity or time selectivity the pilot pattern may be such that there are clusters for frequency selective channels as well as clusters for time selective channels in the same pilot pattern, e.g. some clusters arranged in the pattern of clusters 304, 306, 308, or 310 and some clusters arranged in the pattern of clusters 324, 326, 328, or 330.

In some embodiments, the pilot pattern chosen to be utilized may be based upon the conditions for which the channel is being optimized. For example, for channels that may have high-speed movement, e.g. vehicular, of mobile stations a time-selective pilot pattern may be preferred, whereas for slow-speed movement of mobile station, e.g. pedestrians, a frequency selective pilot pattern may be utilized. In other embodiment, the pilot pattern can be chosen based upon channel conditions, a determination made after a pre-determined number of hop periods.

Referring to FIGS. 3C-3E, additional pilot patterns are depicted. In FIG. 3C, a block is depicted as having a pilot pattern similar to that of 3B, except that there are a greater number of clusters, e.g. 9, and the size of block has changed. The additional pilots may be utilized to improve channel estimation properties. It should be noted that number of clusters and pilots per cluster may vary depending on a measured velocity of a user, e.g. a user of greater velocity may have more clusters, an/or pilots per cluster, than a user with a lesser velocity.

In FIG. 3D, a pilot program with additional pilots for frequency selective conditions is included. This may be useful for user with highly frequency selective channels, which may, in certain aspects, be detected based upon delay spread estimates of the users. Also, channel statistics over time for the sector or cell or user session can provide information to calculate a cell frequency selectivity threshold, sector frequency selectivity threshold, or a user specific frequency selectivity threshold to switch to these patterns with additional and/or varied pilots. The additional and/or varied pilots may be quite useful due to frequency variations and multi-path transmissions that will vary due to the different channel conditions at different frequencies, e.g., for mobile users or others having a greater frequency selectivity.

In FIG. 3E, pilot clusters for multi-input multi-output (MIMO) mobile stations that are transmitting multiple layers is depicted. Each transmit antenna, here being four, includes pilot symbols in the cluster. Therefore, if less than all antennas are being utilized then less pilots can be included in each cluster.

Figure 4A:
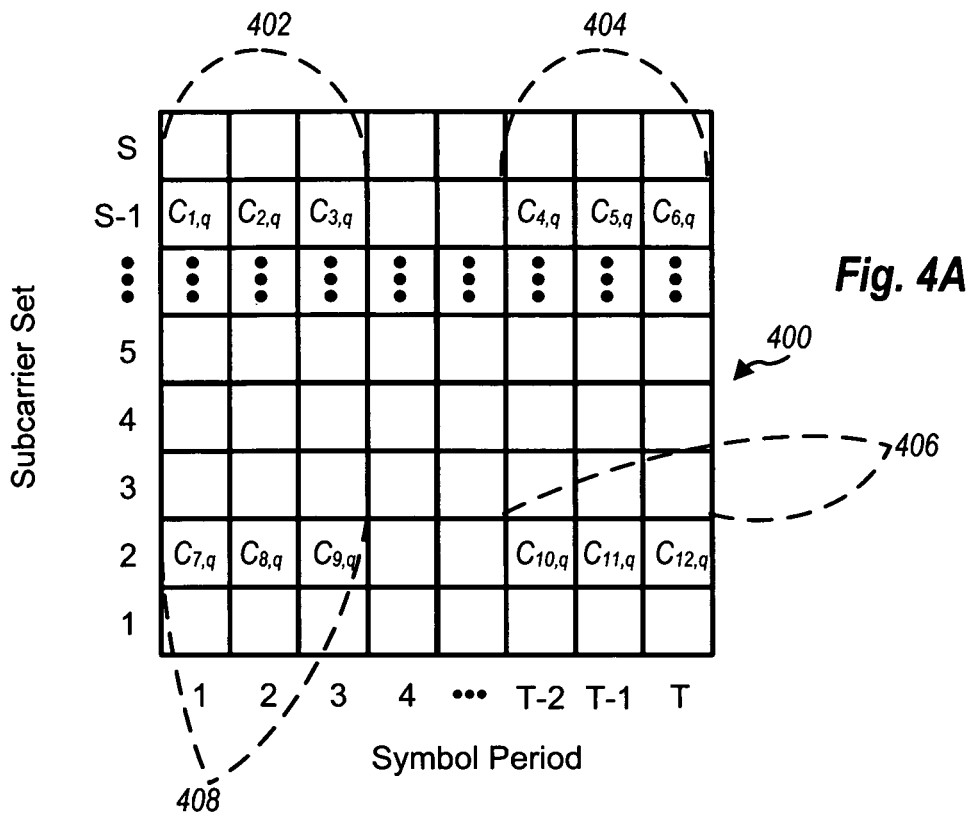
FIG. 4A illustrates a pilot symbol scrambling scheme according to an embodiment.
Figure 4B:
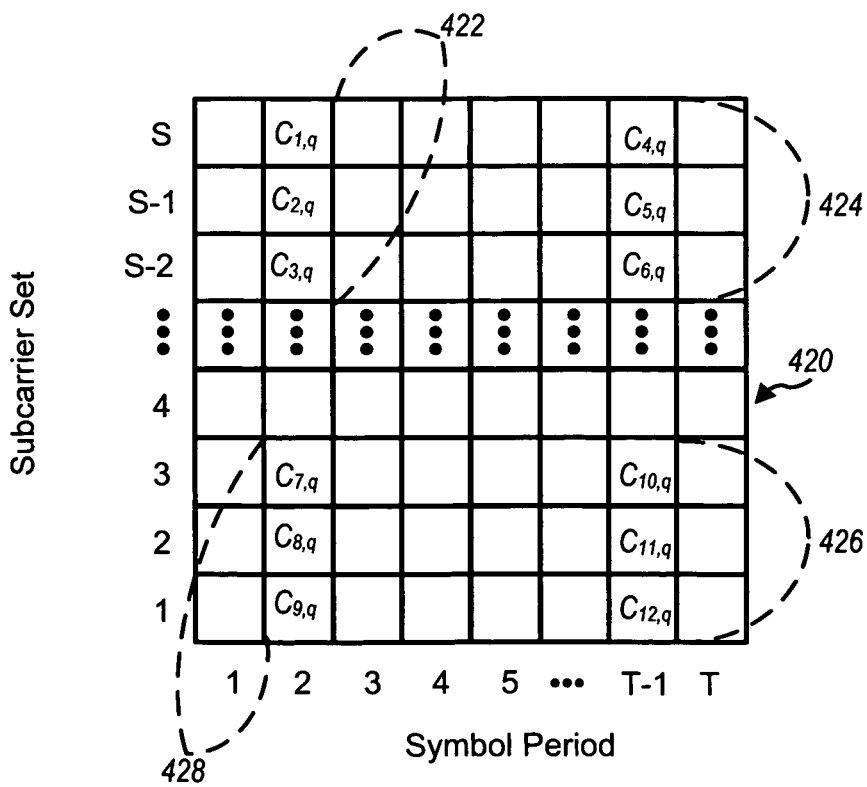
FIG. 4B illustrates a pilot symbol scrambling scheme according to another embodiment.

Referring to FIGS. 4A and 4B, pilot allocation schemes according to further embodiments are illustrated. In FIG. 4A, hop regions 400 includes pilot symbols $C_{1,q}$, $C_{2,q}$, and $C_{3,q}$, arranged in cluster 402; $C_{4,q}$, $C_{5,q}$, and $C_{6,q}$, arranged in cluster 404; $C_{7,q}$, $C_{8,q}$, and $C_{9,q}$, arranged in cluster 406; and $C_{10,q}$, $C_{11,q}$, and $C_{12,q}$ arranged in cluster 408. In an embodiment, in order to improve spatial diversity in hop regions where multiple mobile stations provide overlapping pilot symbols, the pilot symbols of different mobile stations should be multiplexed in such a way over the same OFDM symbol period and tone so that the pilot symbols are substantially orthogonal when received at the antennas of the cluster of the base station.

In FIG. 4A, each of the pilot symbols $C_{1,q}$, $C_{2,q}$, $C_{3,q}$, $C_{4,q}$, $C_{5,q}$, $C_{6,q}$, $C_{7,q}$, $C_{8,q}$, $C_{9,q}$, $C_{10,q}$, $C_{11,q}$, and $C_{12,q}$ are assigned to multiple mobile stations of hop region 400, that is each symbol period includes multiple pilot symbols, from a number of different mobile station stations. Each of the pilot symbols in a pilot symbol cluster, e.g. cluster 402, 404, 406, and 408, are generated and transmitted in such a way that a receiver of the pilots symbols in the cluster, e.g. base station, can receive them so that they are orthogonal with respect to the pilot symbols from each other mobile station in the same cluster. This can be done by applying a predetermined phase shift, e.g. a scalar function to multiply, each of the samples constituting the pilot symbols transmitted by each of the mobile stations. To provide orthogonality, the inner products of vectors representing the sequence of the scalar functions in each cluster for each mobile station may be zero.

Further, in some embodiments, it is preferred that the pilot symbols of each cluster are orthogonal to the pilot symbols of each other cluster of the hop region. This can be provided in the same manner as orthogonality is provided for the pilot symbols within each cluster from a different mobile station, by utilizing a different sequence of scalar functions for the pilot symbols of each mobile station in each cluster of pilot symbols. Mathematical determination of orthogonality can be made by selecting a sequence of scalar multiples for each of the pilot symbols for a particular cluster for the particular mobile station the vector of which is orthogonal, e.g. the inner product is zero, with respect to a vector representing the sequence of scalar multiples used for the pilot symbols of the other mobile stations in all the clusters and the same mobile station in the other clusters.

In an embodiment the number of mobile stations that may be supported, where orthogonality of the pilot symbols across each of the clusters is provided, is equal to the number of pilot symbols that are provided per pilot symbol cluster.

In the embodiments of FIGS. 4A and 4B, the q-th user of Q overlapping users, $1 \leq q \leq Q$, uses the sequence S of size $N_p$, where $N_p$ is the total number of pilot tones (In FIGS. 4A and 4B, $N_p=12$):

$$S_q = [S_{1,q} \ldots S_{N_p,q}]^T, 1 \leq q \leq Q, \quad (1)$$

here ($^T$) denotes transpose of the matrix containing the sequences. As discussed above, the sequences of scalar functions, in each cluster of pilot symbols, should be different for different mobile stations in order to obtain consistent estimates of the respective channels through the reduction of interference between pilot symbols. Moreover, the sequences should be linearly independent, as such it is preferred that no sequence or vector be a linear combination of the remaining sequences. Mathematically, this may defined in that the $N_p \times Q$ matrix $$S = [S_1 \ldots S_Q] \quad (2)$$

is of full column rank. It should be noted in the expression (2) above matrix $Q \leq N_p$. That is, the number of overlapping mobile stations should not exceed the number of total pilot symbols in the hop region.

Based upon the above, any set of sequences Q with a full-rank S enables consistent channel estimation. However, in other embodiment, the actual estimation accuracy may depend on the correlation properties of S. In an embodiment, as can be determined utilizing equation (1), performance may be improved when any two sequences are mutually (quasi-) orthogonal in the presence of the channel. Mathematically, this condition may be defined by $$\sum_{k=1}^{N_p} H_k S_{k,p}^* S_{k,q} \approx 0 \text{ for all } 1 \leq p, q \leq Q, \quad (3)$$

where $H_k$ is a complex channel gain corresponding to the k-th pilot symbol, $1 \leq k \leq N_p$. In a time and frequency invariant channel $H_1 = H_2 = \ldots = H_{N_p}$) condition (3) reduces to the requirement of mutually orthogonal sequences:

$$\sum_{k=1}^{N_p} S_{k,p}^* S_{k,q} \approx 0 \text{ for all } 1 \leq p, q \leq Q, \quad (4)$$

enforcing this condition for any possible channel realization from a typical set of channels may be impractical. In fact, expression (3) may be satisfied when a channel exhibits limited time and frequency selectivity, which is the case of pedestrian channels with a relatively small delay spread. However, the conditions may be substantially different on vehicular channels and/or channels with a significant delay spread, thereby resulting in performance degradation.

As discussed with respect to FIGS. 3A and 3B, pilot allocation patterns consist of a few clusters of pilot symbols placed close to the edges of the hop region, where each cluster is contiguous in time (FIG. 3A) and/or frequency (FIG. 3B). Since channel variations inside every cluster are generally limited, due to contiguous nature of the pilot symbols in time and frequency and continuity of the channel in time and frequency. Hence making different sequences orthogonal over each cluster allows condition (3) to be met. A potential drawback of this solution is that the number of overlapping mobile stations that can be orthogonal over every cluster is limited to the size of the cluster, denoted here $N_C$. In the example shown in FIGS. 4A and 4B, $N_C$=3, and hence up to Q=3 mobile stations can be separated orthogonally in such an embodiment. In fact, a fairly small number of Q is sufficient in many practical scenario. When Q>$N_C$, it may be difficult to keep all mobile stations orthogonal over every cluster, since there may be some inter-symbol interference. Hence, approximate orthogonality may be sufficient, with some performance loss of time and/or frequency varying channels if Q>$N_C$.

In an embodiment, a set of design parameters for the sequences of scalar functions $S=[S_1 \ldots S_Q]$ may be defined by:

Any two sequences are orthogonal over the entire set of pilot symbols, thereby satisfying $$\sum_{k=1}^{N_P} S_{k,p}^* S_{k,q} = 0 \text{ for all } 1 \leq p, q \leq Q, \quad (5)$$

Subsequent groups of $N_C$ sequences are such that any two sequences within a group are mutually orthogonal over any cluster of pilots:

$$\sum_{k=1}^{N_C} S_{k+lN_C,p}^* S_{k+lN_C,q} = 0, nN_C + 1 \leq p, \quad (6)$$

$$q \leq \min\{(n+1)N_C, Q\}, 0 \leq n < \frac{Q}{N_C}, 0 \leq l < M_C.$$

All the elements $S_{k,q}$ of all the sequences have substantially equal absolute values, e.g. approximately the same power.

where $M_C$ denotes the total number of clusters of size $N_C$, so that the number of pilots $N_p = M_C N_C$.

In an embodiment, the sequences $S=[S_1 \ldots S_Q]$ are created using exponential functions so that so that the same energy per symbol provided by each sequence. Further, in this embodiment, the groups of $N_C$ sequences may be made mutually orthogonal within each cluster, regardless of cluster size since exponents are not limited to particular multiples, and with the sequences used in every other cluster across all of the pilot symbols, by (i) defining exponential sequences within each cluster; and (ii) populating the intra-cluster portions across clusters. This can be seen equation (7) where a N×N Discrete Fourier Transform (DFT) basis is defined.

$$F(N) = \begin{bmatrix} F_{1,1}(N) & F_{1,2}(N) & \cdots & F_{1,N}(N) \\ F_{2,1}(N) & F_{2,1}(N) & \ddots & F_{2,N}(N) \\ \vdots & \vdots & \ddots & \vdots \\ F_{N,1}(N) & F_{N,2}(N) & \cdots & F_{N,N}(N) \end{bmatrix} \quad (7)$$

$$= \begin{bmatrix} 1 & 1 & \cdots & 1 \\ e^{i2\pi \frac{1}{N}} & e^{i2\pi \frac{2}{N}} & \ddots & e^{i2\pi \frac{(N-1)2}{N}} \\ \vdots & \vdots & \ddots & \vdots \\ e^{i2\pi \frac{N-1}{N}} & e^{i2\pi \frac{2(N-1)}{N}} & \cdots & e^{i2\pi \frac{(N-1)(N-1)}{N}} \end{bmatrix}$$

The above expression (7) may be written in a compact block form as follows:

$$S = [S_1, \ldots, S_Q] = <F(M_C) \otimes F(N_C)>_{:,1:Q} \quad (8)$$

where $<\cdot>_{:,1:Q}$ denotes matrix block spanned by columns 1 through Q of the original matrix. A more general form of S may be given by $$S = [S_1, \ldots S_Q] = <V \otimes U>_{:,1:Q} \quad (9)$$

where U is an arbitrary $N_C \times N_C$ unitary matrix ($U^*U = I_{N_p}$) and V is an arbitrary $M_C \times M_C$ unitary matrix ($U^*U = I_{M_C}$).

In an embodiment the number of mobile stations that may be supported, where orthogonality of the pilot symbols across each of the clusters is provided, is equal to the number of pilot symbols that are provided per pilot symbol cluster.

In an embodiment, the exponential functions utilized to multiply the samples of the pilot symbols are generated utilizing a discrete Fourier transform function, which is well known. In embodiments where the discrete Fourier transform function is used to generate the symbols for transmission, an extra phase shift is applied during formation of the symbols using the discrete Fourier transform function in generating the symbols for transmission.

In the embodiments of FIGS. 4A and 4B, the inner products of vectors representing the sequence of the scalar functions in each cluster for each mobile station may be zero. However, in other embodiments this is not the case. It may be arranged so that only quasi-orthogonality between the sequences of the scalar functions in each cluster for each mobile station is provided.

Further in those situations, where the number of mobile stations assigned to the hop region is less than the number of pilot symbols assigned to the hop region, the scalar shifts may still be decoded at the base station in order to be utilized to perform interference estimation. Therefore, these pilot symbols may be utilized for interference estimation since they are orthogonal or quasi-orthogonal with respect to pilot symbols by the other mobile stations assigned to the hop region.

The approaches described with respect to FIGS. 4A and 4B may be applied to the cluster and structures depicted in FIGS. 3C-3E. In these cases, the length and number of the sequences may need to vary to support the number of clusters and the number of pilot symbols per cluster.

Figure 5:
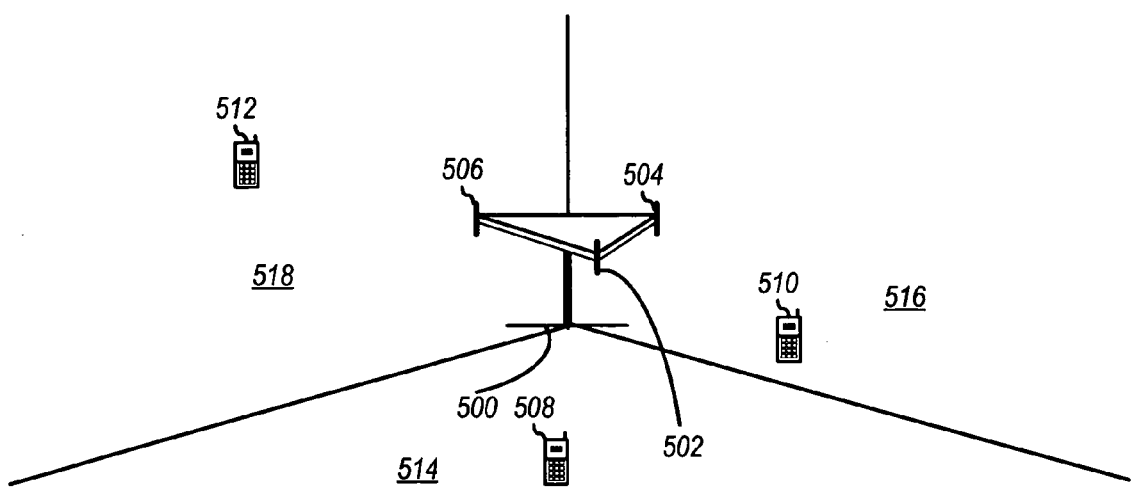
FIG. 5 illustrates a base station with multiple sectors in a multiple access wireless communication system according to an embodiment.

Referring to FIG. 5, a base station with multiple sectors in a multiple access wireless communication system according to an embodiment is illustrated. A base station 500 includes multiple antenna groups of antennas 502, 504, and 506. In FIG. 5, only one antenna is shown for each antenna group 502, 504, and 506, however, multiple antennas may be utilized. The multiple antennas of each antenna group 502, 504, and 506 may be utilized to provide spatial diversity at the base station to signals transmitted from mobile stations in a corresponding sector, in addition to the spatial diversity provided to the different physical locations of the different mobile stations.

Each antenna group 502, 504, and 506 of base station 500 is configured to communicate with mobile stations in a sector to be covered by base station 500. In the embodiment of FIG. 5, antenna group 502 covers sector 514, antenna group 504 covers sector 516, and antenna group 506 covers sector 518. Within each sector, as described with respect to FIG. 4, the pilot symbols transmitted from the mobile stations may be accurately demodulated and used for channel estimation, and other functionally, at the base station due the orthogonality or the approximately orthogonality between all of the inter-sector pilot symbol clusters.

However, intra-sector interference may exist for mobile stations near the boundary of a sector, e.g. mobile station 510 which is near a boundary of sectors 514 and 516. In such a case, pilot symbols from mobile station 510 may be at lower powers than pilot symbols from other mobile stations in both sectors 514 and 516. In such a situation, mobile station 510 could eventually benefit from reception at both sectors antennas, especially when its channel to the serving sector, i.e. sector 516 signals may fade if power is increased from antenna 504. In order to fully benefit from the reception from antenna 502 of sector 514, accurate estimate of the channel of mobile station 510 between antenna 502 of sector 514 should be provided. However, if the same or substantially the same sequences are used for the scalar multiples of the pilot symbols in different sectors with the present pilot design, pilot symbols transmitted by mobile station 510 may collide with pilot symbols transmitted by mobile station 508 which is scheduled in sector 514 on the same hop region as mobile station 510 is scheduled in sector 516. Further, in some cases depending on the power control strategy utilized by the base station to control the mobile stations, the power level of symbols from mobile station 508 may substantially exceed the signal level of mobile station 510 at antenna group 502 of the sector 514, especially when mobile station 508 is close to the base station 500.

In order to combat the intra-sector interference that may arise, scrambling codes may be used for the mobile stations. The scrambling code may unique to individual mobile stations or may be the same for each of the mobile stations communicating with an individual sector. In an embodiment, these specific scrambling codes allow antenna group 502 to see a composite channel of mobile stations 508 and 510.

In the case where a single mobile station is assigned to an entire hop region, user specific scrambling sequences may be provided so that every mobile station in a given sector makes use of the same pilot sequence; the construction of these sequences is described with respect to FIGS. 4A and 4B. In the example of FIG. 5, mobile stations 508, 510, and 512 may have different user specific scrambling sequences and therefore sufficient channel estimation may be achieved.

Where multiple mobile stations are, or may be, assigned to a same hop region, two approaches may be utilized to reduce intra-cluster interference. Firstly, user specific scrambling sequences may be utilized if the cluster size $N_C$ is greater or equal than the number of overlapping mobile stations in each sector Q times the number of sectors in the cell. If this is the case, distinct sets of Q different user-specific scrambling codes may be assigned to different sectors.

However, if the cluster size $N_C$ is less than the number of overlapping mobile stations in each sector Q times the number of sectors in the cell, this may be important if a goal of system design is to keep $N_C$ to maintain a limited pilot overhead, user specific scrambling codes may not be effective to reduce inter-cell interference. In such cases, a sector specific scrambling sequence may be utilized along with the user specific scrambling sequence.

A sector specific scrambling sequence is a sequence $X_s=[X_{1,s}, \ldots, X_{N_p,s}]^T$ of $N_p$ complex functions that multiply the respective elements of the sequences $S=[S_1 \ldots S_Q]$, for all mobile stations in a same sector. In a cell consisting of S sectors, a set of S sector specific scrambling sequences $X_1, \ldots, X_S$ may be utilized to multiply the sequences $S=[S_1 \ldots S_Q]$ of the mobile stations. In such a case, mobile stations within different sectors, for example sector 514 and 516 that may have mobile stations that utilize the same user specific scrambling sequences $S=[S_1 \ldots S_Q]$ may differ due to different sector specific scrambling sequences $X_{s_1}$ and $X_{s_2}$ utilized to multiply the user specific scrambling sequence.

Similarly to user-specific scrambling, it is preferred that all of the entries of $X_1, \ldots, X_S$ have approximately equal absolute values to maintain approximately equal power between the pilot symbols. In other embodiments, it is preferred that entries of $X_1, \ldots, X_S$ be such that any pair of pilot symbols in a pilot symbol cluster, corresponding to any two combinations of user specific and sector specific scrambling sequences satisfies, should satisfy condition (3). One way to approach to the choice of contents of each sector specific sequence $X_1, \ldots, X_S$ consists of an exhaustive search of sequences such as the elements of every sequence are taken from some constant modulus (PSK) constellation such as QPSK, 8-PSK. The selection criterion may be based upon the "worst case" channel estimation error variance corresponding to the "worst" combination of mobile stations from different sectors and different user specific scrambling that are based upon the potential channel environment. Channel estimation error may be computed analytically based on statistical properties of the channel. Specifically, a trace of the covariance matrix of a channel estimate that assume channel correlation structure based on an anticipated fading model and parameters such as mobile station velocity, which defines time selectivity, and propagation delay spread which defines frequency selectivity. The analytical expressions for the minimum achievable channel estimation error subject to a given correlation structure of the true channel are known in the art. Other similar criteria may be used to optimize the choice of $X_1, \ldots, X_S$ as well.

In an embodiment where Quadrature Amplitude Modulation is utilized as the modulation scheme, a set of sector specific scrambling sequences $X_1, \ldots, X_S$ that may be utilized is shown in Table 1 below. Each entry of the table specifies I and Q components of every $X_{k,s}$, $1 \leq s \leq S$ and $1 \leq k \leq N_p$ with S=3 and $N_p$=12.

TABLE 1

| k | 1 | 2 | 3 | 4 | 5 | 6 | 7 | 8 | 9 | 10 | 11 | 12 |
|---|---|---|---|---|---|---|---|---|---|---|---|---|
| s = 1 | {+1,+0} | {+1,+0} | {+1,+0} | {+1,+0} | {+1,+0} | {+1,+0} | {+1,+0} | {+1,+0} | {+1,+0} | {+1,+0} | {+1,+0} | {+1,+0} |
| s = 2 | {+1,+0} | {+1,+0} | {−1,+0} | {+1,+0} | {+0,−1} | {+1,+0} | {+1,+0} | {+0,−1} | {+0,+1} | {+0,+1} | {+0,+1} | {+0,+1} |
| s = 3 | {+0,+1} | {−1,+0} | {+1,+0} | {+1,+0} | {+0,+1} | {+0,−1} | {+0,−1} | {+0,+1} | {+1,+0} | {+0,−1} | {+1,+0} | {−1,+0} |

In an embodiment where Quadrature Amplitude Modulation is utilized as the modulation scheme, a set of sector specific scrambling sequences $X_1, \ldots, X_S$ that may be utilized is shown in Table 1 below. Each entry of the table specifies I and Q components of every $X_{k,s}$, $1 \leq s \leq S$ and $1 \leq k \leq N_p$ with S=3 and $N_p$=12.

In some embodiments, each cell in a communication network may utilize the same sequences for sector specific scrambling sequences.

Figure 6:
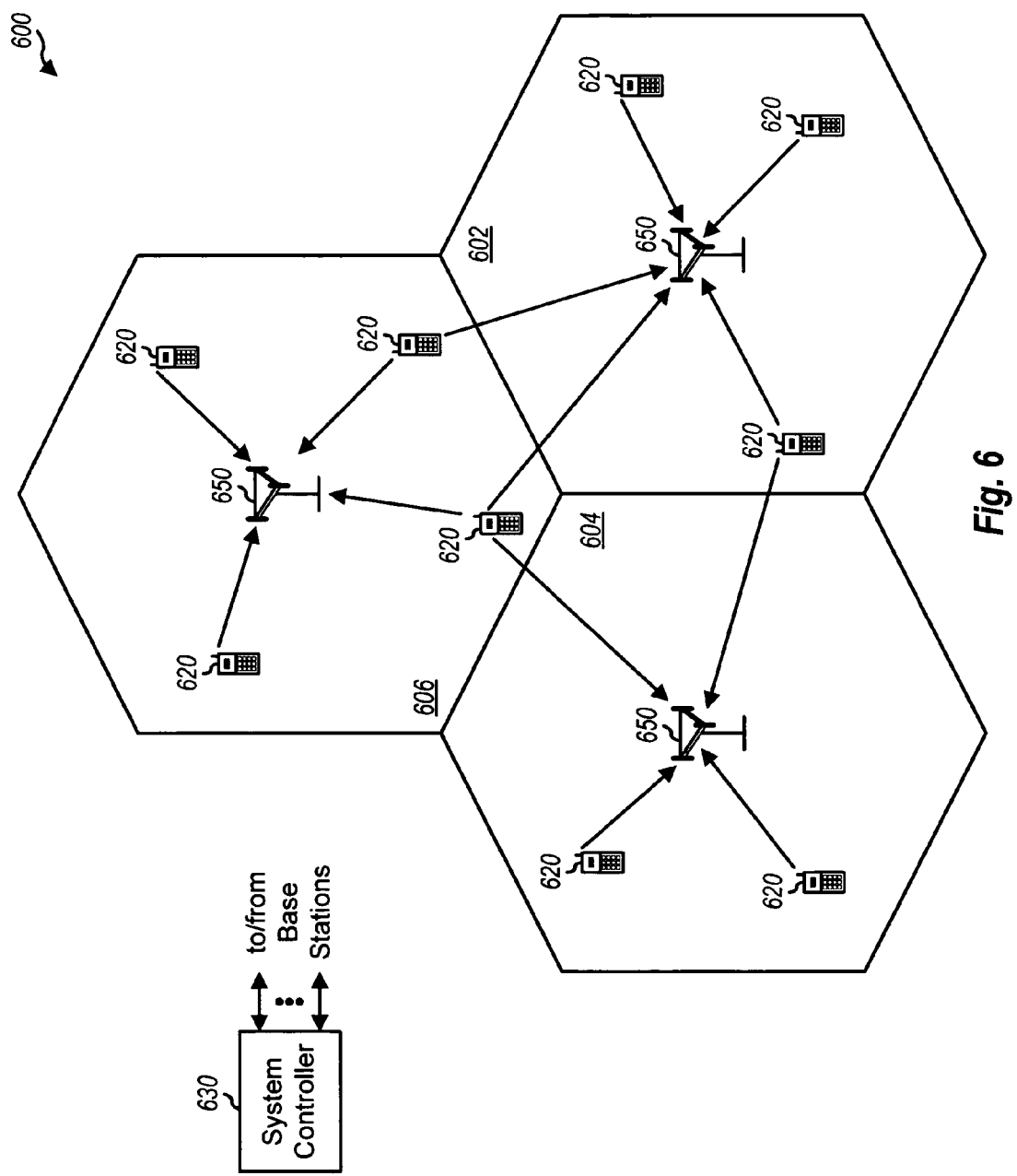
FIG. 6 illustrates a multiple access wireless communication system according to another embodiment.

Referring to FIG. 6, a multiple access wireless communication system 600 according to another embodiment is illustrated. In the event when the same sets of user specific and sector specific scrambling sequences are utilized in multiple cells, e.g. cells 602, 604, and 606, interference coming from the adjacent cells may lead to channel estimation accuracy degradation due to pilot symbol collision. For example, a channel estimate within the sector of interest may be biased by the channel of a mobile station from the adjacent cell which mobile station has the same user specific and sector specific scrambling. To avoid such a bias, a cell specific scrambling may be utilized, in addition to the user specific scrambling and sector specific scrambling. A cell specific scrambling schema may be defined by $Y_c = [Y_{1,c}, \ldots Y_{N_p,s}]^T$ which is a vector of scalar functions that multiply the respective sequence of pilot symbols for every mobile station in the cell. The overall sequences of pilot symbols $Z_{(q,s,c)} = [Z_{1,(q,s,c)}, \ldots, Z_{N_p,(q,s,c)}]^T$ which corresponds to a mobile station with q-th user specific scrambling in the s-th sector of the c-th cell may defined as follows. If sector specific scrambling is utilized:

$$Z_{k,(q,s,c)} = S_{k,q} \cdot X_{k,s} \cdot Y_{k,c}, \ 1 \leq k \leq N_p, \ 1 \leq s \leq S, \ c=1,2, \quad (10)$$

If sector specific scrambling is not utilized:

$$Z_{k,(q,s,c)} = S_{k,q} \cdot Y_{k,c}, \ 1 \leq k \leq N_p, \ 1 \leq s \leq S, \ c=1,2, \quad (11)$$

As already mentioned, the use of sector specific scrambling is recommended when Q>1 and is not recommended when Q=1.

Unlike user specific and sector specific scrambling, no particular optimization of cell specific scrambling sequences need be utilized. The two design parameters that may be utilized are that:

All the elements of cell specific scrambling sequences have equal modulus.

Cell specific scrambling sequences differ substantially for different cells.

In the absence of pre-determined assignment of cell specific scrambling sequences over a network of base stations, a (pseudo)-random cell specific scrambling sequences from some constant modulus (PSK) constellation such as QPSK, 8-PSK may be utilized in forming the Y cell specific sequences. To further enhance randomization of cell specific scrambling and avoid bad steady combinations of scrambling sequences, cell specific scrambling may be changed periodically in a (pseudo-)random fashion. In some embodiments, the periodic change may be every frame, superframe, or multiple frames or superframes.

Figure 7:
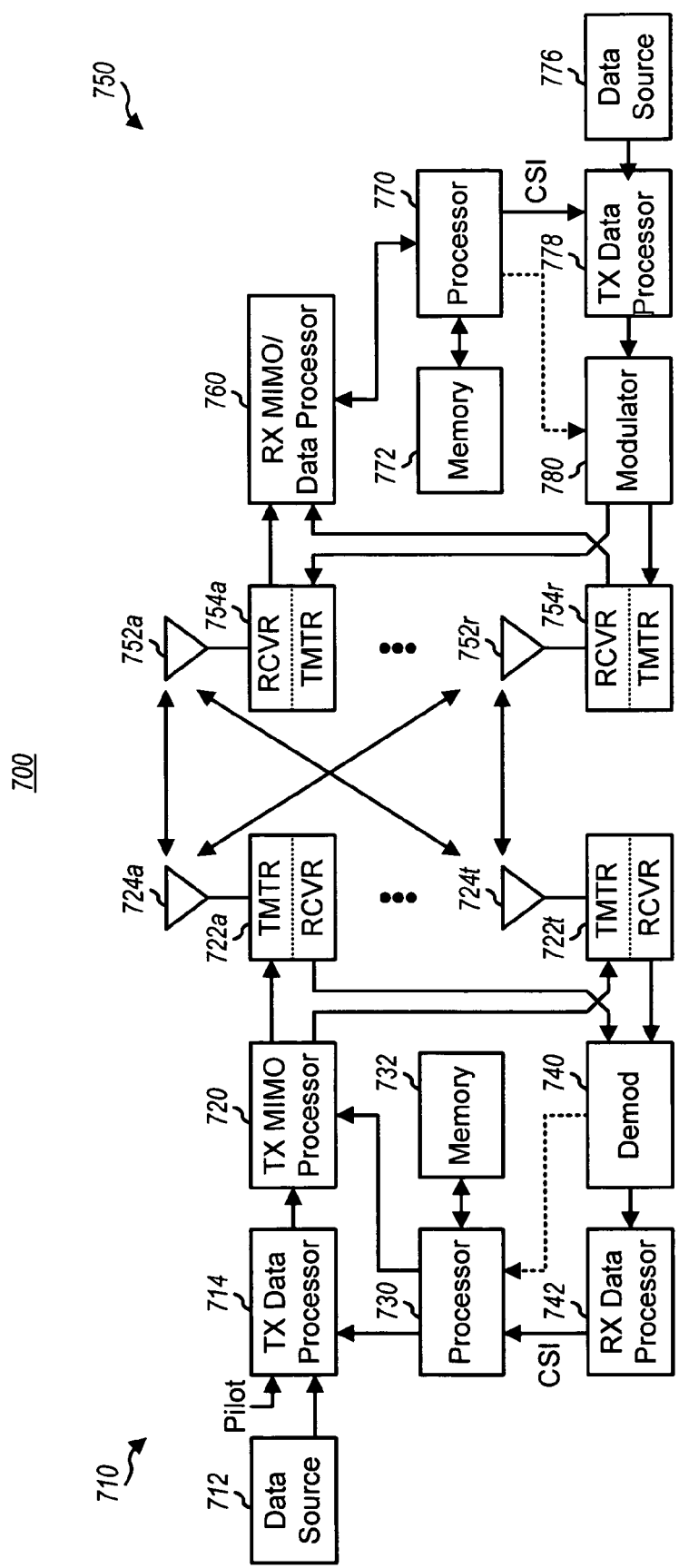
FIG. 7 illustrates a block diagram of an embodiment of a transmitter system and a receiver system in a multi-input multi-output multiple access wireless communication system.

FIG. 7 is a block diagram of an embodiment of a transmitter system 710 and a receiver system 750 in a MIMO system 700. At transmitter system 710, traffic data for a number of data streams is provided from a data source 712 to a transmit (TX) data processor 714. In an embodiment, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed on provided by controller 130.

The modulation symbols for all data streams are then provided to a TX processor 720, which may further process the modulation symbols (e.g., for OFDM). TX processor 720 then provides $N_T$ modulation symbol streams to $N_T$ transmitters (TMTR) 722a through 722t. Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 124a through 124t, respectively.

At receiver system 750, the transmitted modulated signals are received by $N_R$ antennas 752a through 752r and the received signal from each antenna 752 is provided to a respective receiver (RCVR) 754. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The processing by RX data processor 760 is described in further detail below. Each detected symbol stream includes symbols that are estimates of the modulation symbols transmitted for the corresponding data stream. RX data processor 760 then demodulates, deinterleaves, and decodes each detected symbol stream to recover the traffic data for the data stream. The processing by RX data processor 760 is complementary to that performed by TX processor 720 and TX data processor 714 at transmitter system 710.

RX processor 760 may derive an estimate of the channel response between the $N_T$ transmit and $N_R$ receive antennas, e.g., based on the pilot information multiplexed with the traffic data. RX processor 760 may identify the pilot symbols according to pilot patterns stored in memory, e.g. memory 772 that identify the frequency subcarrier and symbol period assigned to each pilot symbol. In addition, the user specific, sector specific, and cell specific scrambling sequences may be stored in memory so that they may be utilized by RX processor 760 to multiple the received symbols so that the proper decoding can occur.

The channel response estimate generated by RX processor 760 may be used to perform space, space/time processing at the receiver, adjust power levels, change modulation rates or schemes, or other actions. RX processor 760 may further estimate the signal-to-noise-and-interference ratios (SNRs) of the detected symbol streams, and possibly other channel characteristics, and provides these quantities to a controller 770. RX data processor 760 or controller 770 may further derive an estimate of the "operating" SNR for the system. Controller 770 then provides channel state information (CSI), which may comprise various types of information regarding the communication link and/or the received data stream. For example, the CSI may comprise only the operating SNR. The CSI is then processed by a TX data processor 778, which also receives traffic data for a number of data streams from a data source 776, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to recover the CSI reported by the receiver system. The reported CSI is then provided to controller 730 and used to (1) determine the data rates and coding and modulation schemes to be used for the data streams and (2) generate various controls for TX data processor 714 and TX processor 720.

Controllers 730 and 770 direct the operation at the transmitter and receiver systems, respectively. Memories 732 and 772 provide storage for program codes and data used by controllers 730 and 770, respectively. The memories 732 and 772 store the pilot patterns in terms of cluster locations, user specific scrambling sequences, sector specific scrambling sequences, if utilized, and cell specific scrambling sequences, if utilized. In some embodiments, multiple pilot patterns are stored in each memory so that the transmitter may transmit and the receiver may receive both frequency selective pilot patterns and time selective pilot patterns. Also, combination pilot patterns having clusters geared for time selective channels and frequency selective channels may be utilized. This allows a transmitter to transmit a specific pattern based upon a parameter, such a random sequence, or in response to an instruction from the base station.

Processors 730 and 770 then can select which of the pilot patterns, user specific scrambling sequences, sector specific scrambling sequences, and cell specific scrambling sequences are to be utilized in transmission of the pilot symbols.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 7 illustrates a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 7.

Figure 8:
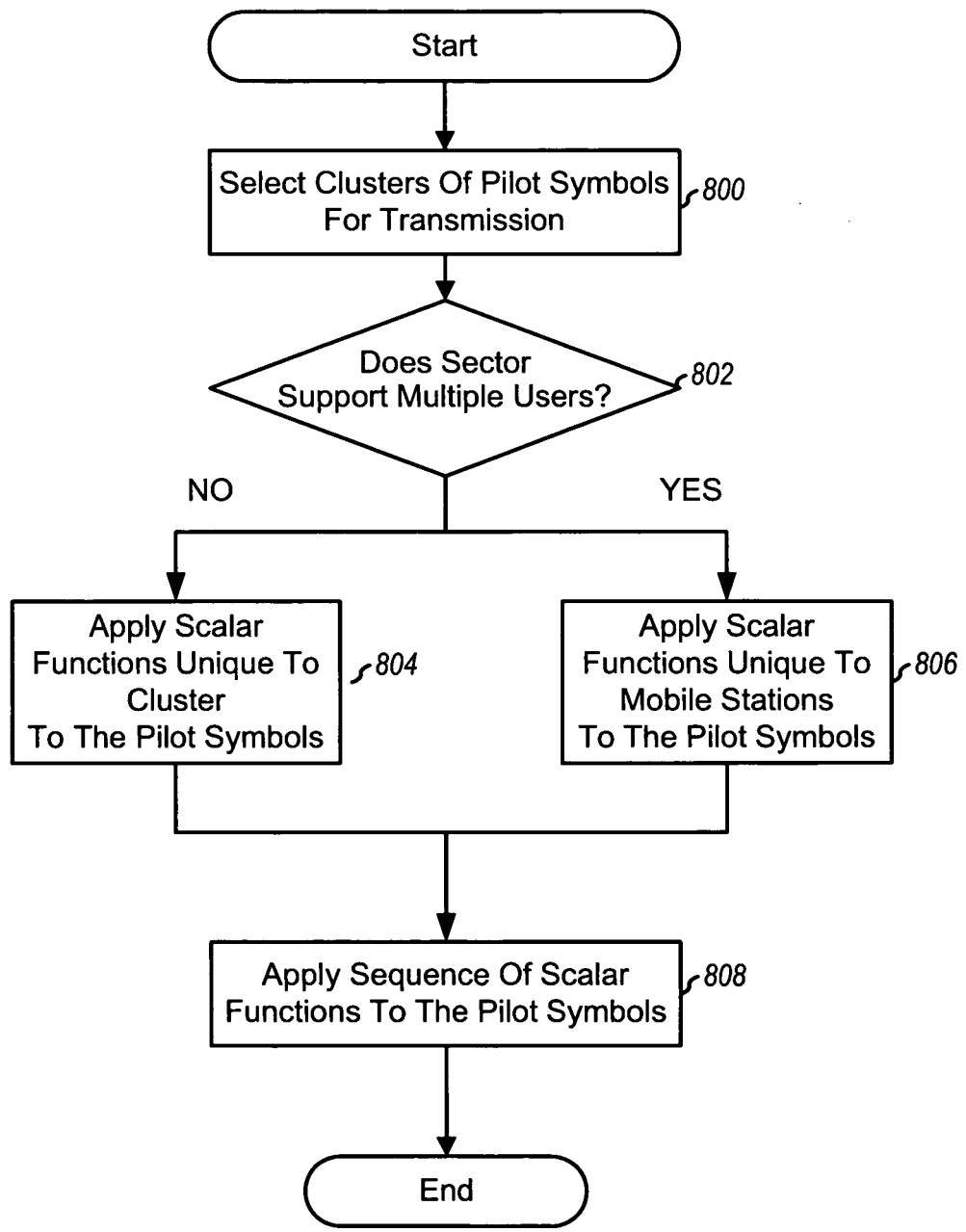
FIG. 8 illustrates a flow chart of a method of pilot symbol generation according to an embodiment.

Referring to FIG. 8, a flow chart of a method of pilot symbol generation according to an embodiment is illustrated. A plurality of pilot symbol clusters is selected to be transmitted during a hop region from a particular mobile station, block 800. These pilot symbol clusters may be all aligned for transmission in a frequency selective (FIG. 3A), a time selective channel (FIG. 3B), or a combination of clusters some of which are aligned for transmission in a frequency selective and a time selective channel. Further, the pilot clusters may be selected based upon whether there is a high degree of the mobility for the user. This may be done to improve channel estimation at the base station. Also, the number of antennas used to transmit at the mobile station, as well as the number of information streams being transmitted from those antennas may be utilized the number of clusters selected and the number of pilot symbols per cluster.

Once the pilot symbol clusters are selected, a determination is made as to whether the cluster of the base station in which the mobile station is communicating supports, or is in communication with, multiple mobile stations, block 802. This determination may be based upon predetermined knowledge of the network in which the mobile station. Alternatively, this information may be transmitted from the sector for the base station as part of its pilot information or broadcast messages.

If the cluster does not support communication, or is not currently in communication with multiple mobile stations, then scalar functions are applied to the pilot symbols that are unique to the cluster with which the mobile station is communicating, block 804. In an embodiment, the scalar functions for each sector may be stored in the mobile station and utilized depending on a sector identification signal that is part of its part of its pilot information or broadcast messages.

If the cluster does support communication with multiple mobile stations, then scalar functions are applied to the pilot symbols that are unique to the mobile station, block 806. In some embodiments, the scalar functions for each mobile station may be based upon its unique identifier used for registration or provided to the device at the time of manufacture.

After scalar functions, that are unique either to the sector with which the mobile station is communicating or the mobile station itself, are applied to the pilot symbols, another sequence of scalar functions is applied to the pilot symbols, block 808. The sequence of scalar functions relates to the cell in which the mobile station is communicating. This scalar function may vary over time, if each cell is not specifically assigned scalar functions that are known by or provided to the mobile stations. After this operation, the pilot symbols may be transmitted from the mobile station to base station.

The scalar functions discussed with respect to FIG. 8, may in an embodiment involve a phase shift of each of the samples that constitute the pilot symbols. As discussed with respect to FIGS. 4A, 4B, 5, and 6 the scalar functions are selected so that each cluster of pilot symbols is orthogonal to each other set of pilot symbols from the same mobile station in other pilot symbol clusters and in the same and other pilot symbol clusters for other mobile stations the same sector of the base station.

In addition, the blocks described with respect to FIG. 8 may each be implemented as one or more instructions on a computer readable media, such as a memory, which are implemented by a processor, controller, or other electronic circuitry.

Figure 9:
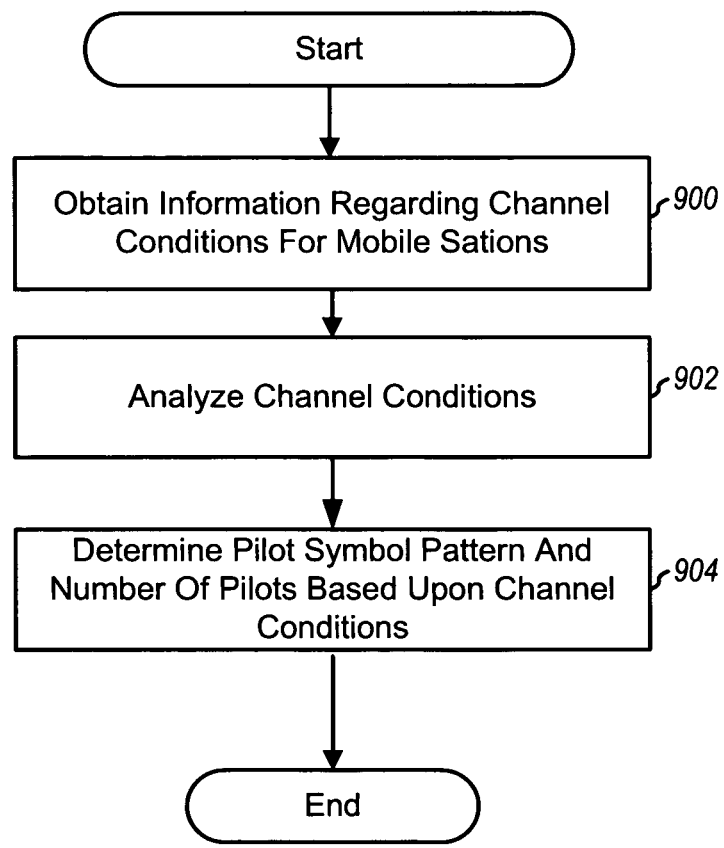
FIG. 9 illustrates a flow chart of a method of altering pilot symbol patterns according to an embodiment.

Referring to FIG. 9, a flow chart of a method of altering pilot symbol patterns according to an embodiment is illustrated. Information regarding channel conditions is obtained, block 900. The information may comprise SNR ratios at one or more mobile stations, a selectivity of the channel, the traffic type, pedestrian or vehicular, delay spreads, or other characteristics of the channel. This information may determined by the base station or may provided as channel quality information feedback provided from the mobile station.

The information is analyzed to determine the channel conditions, block 902. The analysis may be a determination whether the channel is frequency selective, time selective, or a combination of both. The analysis is then utilized to determine a pilot symbol pattern that is to be transmitted from mobile stations that may communicate with the sector or base station, block 904. These pilot symbol clusters may be all aligned for transmission in a frequency selective (FIG. 3A), a time selective channel (FIG. 3B), a combination of clusters some of which are aligned for transmission in a frequency selective and a time selective channel, used for vehicular or other mobile traffic (FIG. 3D), optimized for a MIMO system (FIG. 3E), or combinations thereof. The specific pilot pattern selected may then be used by all of the mobile stations that communicate with the base station or sector until such time as the diagnostic is performed again for the base station or sector.

To implement a specific pilot pattern at mobile stations communicating at a base station or base station sector, an instruction may be sent from the base station or sector to the mobile stations as part of the initialization or set-up procedure. In some embodiments, information as which pilot pattern, user specific scrambling sequence, sector specific scrambling sequence, and/or cell specific scrambling sequence is to be utilized may transmitted in a preamble of one or more data packets that are transmitted from a base station to a mobile station at regular intervals or during initialization or set-up.

It should be noted that the analysis may also be utilized to determine the number of pilot symbols to be transmitted in each cluster of pilot symbols and the groupings of pilot symbols. Also, the blocks described with respect to FIG. 9 may each be implemented as one or more instructions on a computer readable media, such as a memory or removable media, which are implemented by a processor, controller, or other electronic circuitry.

Figure 10:
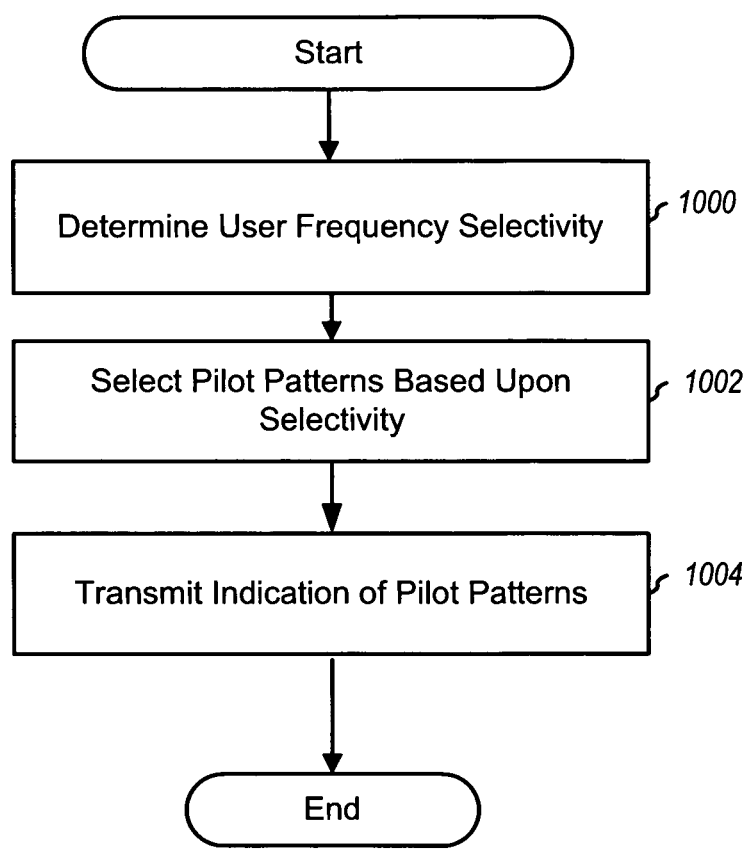
FIG. 10 illustrates a flow chart of a method of pilot pattern selection.

Referring to FIG. 10, a flow chart of a method of pilot pattern selection is illustrated. A determination is made as to the frequency selectivity of a given user, block 1000. This may be done for example based upon a velocity of the user, a dopler spread of the user, delay spread of the user, or other channel information that may be utilized mobility related user conditions. This information may then be utilized to select one or more of a plurality of pilot patterns for transmission by the user to the base station, block 1002. The selection may include, for example, a number of pilots to transmit and the number of pilots in total and by cluster. Further, the selection may include information as to whether the user is a MIMO user as well as the users mobility. The selection may be made by determining the relationship of the frequency selectivity of the user and some frequency selective threshold determined by channel statistics for the user, sector, or cell over one more periods of time. An indication of the pilot pattern in then transmitted to the user, so that the user may utilize the pilot pattern in later transmissions to the base station, block 1004.

It should be noted that while FIG. 10 illustrates the base station may make the determination as to the user mobility, the same approach may be used by the mobile station. In this case, block 1000 may be performed based upon forward link pilots transmitted by the base station, and block 1004 may be omitted.

The techniques described herein may be implemented by various means. For example, these techniques may be implemented in hardware, software, or a combination thereof. For a hardware implementation, the processing units within a base station or a mobile station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments may be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless communication apparatus, comprising:
at least one antenna;
a memory that stores a plurality of patterns of pilot symbols, each of the plurality of patterns comprising four contiguous clusters, each of the four contiguous clusters located at substantially corners of a hop region; and
a processor coupled with the at least one antenna and the memory, the processor configured to select at least one pilot pattern of the stored plurality of pilot patterns for transmission by the at least one antenna based upon a time selectivity or frequency selectivity of a channel, wherein the processor is further configured to select the at least one pilot pattern based upon whether the wireless communication apparatus is to receive a transmission in a Multiple Input Multiple Output (MIMO) mode.

2. The wireless communication apparatus of claim 1, wherein the time selectivity or frequency selectivity of the channel is a function of mobility of the apparatus.

3. The wireless communication apparatus of claim 1, wherein the at least one pilot pattern comprises a frequency selective pilot pattern for the apparatus.

4. The wireless communication apparatus of claim 1, wherein the memory comprises a plurality of scalar functions and wherein the processor is further configured to multiply the pilot symbols in the at least one pilot pattern by at least one of the plurality of scalar functions.

5. The wireless communication apparatus of claim 4, wherein the plurality of scalar functions comprises vectors of scalar functions and wherein each vector is orthogonal to each other vector.

6. The wireless communication apparatus of claim 1, wherein the wireless communication apparatus receives signals using a plurality of frequency subcarriers in a frequency range between a maximum frequency and a minimum frequency and wherein each of the pilot symbol clusters comprises a plurality of pilot symbols so that at least one of the plurality of pilot symbols of each of the plurality of clusters is transmitted using a frequency subcarrier other than the maximum frequency or the minimum frequency.

7. The wireless communication apparatus of claim 6, wherein the frequency range comprises a frequency range of a time frequency block.

8. The wireless communication apparatus of claim 1, wherein the processor is further configured to select the at least one pilot pattern based upon a relationship of a delay spread of the apparatus and the frequency selectivity.

9. A wireless communication apparatus, comprising:
means for storing a plurality of patterns of pilot symbols, each of the plurality of patterns comprising four contiguous clusters, each of the four contiguous clusters located at substantially corners of a hop region to be transmitted from the wireless communication apparatus over a channel; and means, coupled with the means for storing, for selecting at least one pilot pattern of the plurality of pilot patterns for transmission by the wireless communication apparatus based upon a time selectivity or frequency selectivity of the channel, wherein the means for selecting the at least one pilot pattern further comprises means for selecting the at least one pilot pattern based upon whether the wireless communication apparatus is to receive a transmission in a Multiple Input Multiple Output (MIMO) mode.

10. The wireless communication apparatus of claim 9, wherein the means for selecting the at least one pilot pattern further comprises means for selecting the at least one pilot pattern based upon a velocity of the apparatus.

11. The wireless communication apparatus of claim 9, wherein the wireless communication apparatus receives signals using a plurality of frequency subcarriers in a frequency range between a maximum frequency and a minimum frequency and wherein each of the clusters comprises a plurality of pilot symbols so that at least one of the plurality of pilot symbols of each of the plurality of clusters is transmitted using a frequency subcarrier other than the maximum frequency or the minimum frequency.

12. The wireless communication apparatus of claim 11, wherein the means for selecting the at least one pilot pattern comprises means for selecting the at least one pilot pattern based upon relationship of a delay spread of the apparatus and the frequency selectivity.

13. A method for transmitting pilots in a wireless communication apparatus comprising:
    determining a time selectivity or frequency selectivity of a channel of a user; and
    selecting a pilot pattern having four contiguous clusters of pilot symbols at the corners of a hop region for the user based upon the time selectivity or frequency selectivity of the channel,
    wherein said selecting further comprises selecting the pilot pattern based upon whether the wireless communication apparatus is to receive a transmission in a Multiple Input Multiple Output (MIMO) mode.

14. The method of claim 13, wherein determining the time selectivity or frequency selectivity of the channel comprises determining the time selectivity or frequency selectivity of the channel based upon a velocity of the user.

15. The method of claim 14, wherein the selecting the pilot pattern comprises selecting the pilot pattern based upon the velocity of the user with respect to the frequency selectivity.

16. The method of claim 15, wherein the selecting comprises selecting a number of pilots based upon the velocity.

17. The method of claim 13, wherein the determining the time selectivity or frequency selectivity of the channel comprises determining the time selectivity or frequency selectivity of the channel based upon a delay spread of the user.

18. The method of claim 13, wherein the determining the time selectivity or frequency selectivity of the channel comprises determining the time selectivity or frequency selectivity of the channel based upon a Doppler spread.

19. A non-transitory machine-readable medium encoded with instructions for processing a communication signal, the instructions comprising code for:
    determining in a wireless communication apparatus a time selectivity or frequency selectivity of a channel of a user; and
    selecting a pilot pattern for the user based upon the-time selectivity or frequency selectivity of the channel, wherein the pilot pattern is selected from a plurality of patterns of pilot symbols, each of the patterns of pilot symbols comprising a plurality of contiguous clusters disposed substantially at the four corners of a hop region,
    wherein said selecting further comprises selecting the pilot pattern based upon whether the wireless communication apparatus is to receive a transmission in a Multiple Input Multiple Output (MIMO) mode.

* * * * *